(12) United States Patent
Luo et al.

(10) Patent No.: US 10,666,310 B2
(45) Date of Patent: May 26, 2020

(54) PROTECTIVE CASE FOR MOBILE TERMINAL AND ELECTRONIC DEVICE

(71) Applicant: Guangdong OPPO Mobile Telecommunications Corp., Ltd., Dongguan, Guangdong (CN)

(72) Inventors: Yuanli Luo, Guangdong (CN); Yanrong She, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/438,764

(22) Filed: Jun. 12, 2019

(65) Prior Publication Data

US 2019/0386697 A1 Dec. 19, 2019

(30) Foreign Application Priority Data

Jun. 15, 2018 (CN) .................. 2018 2 0930281 U
Jun. 15, 2018 (CN) .................. 2018 2 0939699 U

(51) Int. Cl.
*H04M 1/00* (2006.01)
*H04B 1/3888* (2015.01)
*H04B 1/38* (2015.01)

(52) U.S. Cl.
CPC ............ *H04B 1/3888* (2013.01); *H04B 1/38* (2013.01)

(58) Field of Classification Search
CPC ..... H04B 1/3888; H04B 1/38; H04M 1/0274; H04M 1/0262; H04M 1/0254

(Continued)

(56) References Cited

U.S. PATENT DOCUMENTS 6,149,442 A * 11/2000 Enright ............... H04M 1/0237
439/10
6,175,990 B1 * 1/2001 Kato ..................... G06F 1/1616
16/334

(Continued)

FOREIGN PATENT DOCUMENTS

CN 202311761 U 7/2012
CN 202566751 U 12/2012

(Continued)

OTHER PUBLICATIONS

International search report issued in corresponding international application No. PCT/CN2019/091058, dated Aug. 29, 2019 (4 pages).

(Continued)

*Primary Examiner* — Marceau Milord
(74) *Attorney, Agent, or Firm* — Young Basile Hanlon & MacFarlane, P.C.

(57) ABSTRACT

A protective case for a mobile terminal is disclosed. The protective case for a mobile terminal includes body portion and a rim portion. The body portion has a periphery. The periphery comprises a first straight edge, a second straight edge, and a top edge. The rim portion is fixed to the periphery of the body portion. The rim portion is connected to the first straight edge and the second straight edge, and disconnected to the top edge. The rim portion comprises an internal, an external surface, and a top end surface. A sliding groove is defined in the rim portion. The sliding groove is recessed from the internal surface in a direction towards the external surface, and further extends to the top end surface.

18 Claims, 14 Drawing Sheets

(58) Field of Classification Search
USPC ............ 455/575.8, 90.3, 575.1, 575.3, 575.4
See application file for complete search history.

(56) References Cited

U.S. PATENT DOCUMENTS

| | | | |
|---|---|---|---|
| 6,766,181 B1 * | 7/2004 | Newman | H04M 1/0235 16/341 |
| 7,031,466 B2 * | 4/2006 | Lu | H04M 1/0216 16/303 |
| 7,168,135 B2 * | 1/2007 | Jung | H04M 1/0212 16/330 |
| 7,366,555 B2 * | 4/2008 | Jokinen | H04M 1/0283 455/550.1 |
| 7,499,540 B2 * | 3/2009 | Oliver | G06F 1/1616 379/433.01 |
| 8,014,845 B2 * | 9/2011 | Murakoso | H04M 1/0247 455/575.1 |
| 8,108,015 B2 * | 1/2012 | Sakashita | H04M 1/0216 340/815.4 |
| 8,244,322 B2 * | 8/2012 | Li | H04M 1/0274 361/679.01 |
| 8,396,519 B2 * | 3/2013 | Christensen | H04M 1/0216 455/575.3 |
| 9,748,535 B2 * | 8/2017 | Huang | H01M 2/1022 |
| 9,876,522 B2 * | 1/2018 | Huang | H04B 1/3888 |
| 10,170,738 B2 * | 1/2019 | Huang | H01M 2/1022 |
| 2017/0019512 A1 | 1/2017 | Guerdrum et al. | |
| 2017/0026498 A1 * | 1/2017 | Goldfain | A45C 11/182 |

FOREIGN PATENT DOCUMENTS

| | | |
|---|---|---|
| CN | 202634513 U | 12/2012 |
| CN | 204291069 U | 4/2015 |
| CN | 204517881 U | 7/2015 |
| CN | 204795140 U | 11/2015 |
| CN | 204810341 U | 11/2015 |
| CN | 205030010 U | 2/2016 |
| CN | 105554196 A | 5/2016 |
| CN | 205901389 U | 1/2017 |
| CN | 206101914 U | 4/2017 |
| CN | 208424508 U | 1/2019 |
| CN | 208522825 U | 2/2019 |
| DE | 102015002004 A1 | 8/2016 |
| KR | 1020140029844 B1 | 3/2014 |
| WO | 2018092996 A1 | 5/2018 |

OTHER PUBLICATIONS

European search report, EP19180149, dated Oct. 30, 2019 (9 pages).

* cited by examiner

PROTECTIVE CASE FOR MOBILE TERMINAL AND ELECTRONIC DEVICE

CROSS-REFERENCE TO RELATED APPLICATION(S)

This application claims priorities to Chinese Patent Application No. 201820939699.1, filed on Jun. 15, 2018, and Chinese Patent Application No. 201820930281.4, filed on Jun. 15, 2018, the contents of both of which are herein incorporated by reference in their entireties.

TECHNICAL FIELD

The present disclosure relates to protection technologies for mobile terminals, and in particular, to a protective case for a mobile terminal and an electronic device.

BACKGROUND

At present, in a protective case for a mobile phone, side plates of the mobile phone are all wrapped by the protective case. When the protective case having this design is applied to a new type of mobile phone having a sliding structure, a user needs to frequently remove the protective case of the mobile phone to meet sliding requirements of the sliding structure. Thus, it is very inconvenient to use the protective case.

SUMMARY

In one aspect, a protective case for a mobile terminal is provided in some embodiments of the present disclosure. The protective case for a mobile terminal comprises a body portion and a rim portion. The body portion has a periphery. The periphery comprises a first straight edge, a second straight edge opposite to the first straight edge, and a top edge connected between the first straight edge and the second straight edge. The rim portion is fixed to the periphery of the body portion. The rim portion is connected to the first straight edge and the second straight edge, and disconnected to the top edge. The rim portion comprises an internal surface facing towards the body portion, an external surface, opposite to the internal surface, and a top end surface connected to the internal surface and located at one end of the rim portion that is close to the top edge. A sliding groove is defined in the rim portion. The sliding groove is recessed from the internal surface in a direction towards the external surface, and further extends to the top end surface.

In another aspect, a protective case for a mobile terminal is provided in some embodiments of the present disclosure. The mobile terminal comprises a middle frame, a slider, and an electronic component. The middle frame comprises a front end face, a rear end face opposite to the front end face, a left end face, a right end face disposed opposite to the left end face, a top end face, and a bottom end face disposed opposite to the top end face. Each of the left end face and the right end face is located between the top end face and the bottom end face; each of the top end face and the bottom end face is located between the left end face and the right end face. The slider is slidable relative to the middle frame and has a first position and a second position. The slider comprises a front side surface, a rear side surface disposed opposite to the front side surface, a left-side surface, a right-side surface disposed opposite to the left-side surface, a top surface, and a bottom surface disposed opposite to the top surface. Each of the left-side surface and the right-side surface is located between the top surface and the bottom surface; each of the top surface and the bottom surface is located between the left-side surface and the right-side surface. The electronic component is disposed in the slider. When the slider is in the first position, the electronic component is hidden in the middle frame, the left-side surface is substantially flush with the left end face, the right-side surface is substantially flush with the right end face, and the top surface is substantially flush with the top end face; when the slider is in the second position, the electronic component is exposed out of the middle frame. The protective case comprises a body portion, a first rim portion connected to the body portion, and a second rim portion disposed opposite to the first rim portion and connected to the body portion. The body portion is located between the first rim portion and the second rim portion; the body portion, the first rim portion, and the second rim portion define a receiving space configured to receive the mobile terminal. A surface of each of the first rim portion and the second rim portion that faces towards the receiving space defines a sliding groove, and the sliding groove extends through an edge of the first rim portion or an edge of the second rim portion. When the mobile terminal is received in the receiving space, the first rim portion is attached to the left end face, the second rim portion is attached to the right end face, and the body portion is attached to the rear end face. When the slider is switched between the first position and the second position, the left-side surface and the right-side surface are respectively movable in the sliding groove without contacting with the first rim portion and the second rim portion.

In a further aspect, an electronic device is provided in some embodiments of the present disclosure. The electronic device comprises a mobile terminal and a protective case for the mobile terminal. The protective case is capable of being detachably sleeved at an outer side of the mobile terminal. The mobile terminal comprises a middle frame and a slider. The middle frame comprises a pair of side end faces and a top end face connected between the pair of side end faces. The top end face defines a receiving groove penetrating through the pair of side end faces. The slider is slidable relative to the middle frame, such that the slider is capable of extending out of or retracting into the receiving groove. The protective case for a mobile terminal comprises a body portion and a rim portion. The body portion has a periphery. The periphery comprises a first straight edge, a second straight edge opposite to the first straight edge, and a top edge connected between the first straight edge and the second straight edge. The rim portion is fixed to the periphery of the body portion. The rim portion is connected to the first straight edge and the second straight edge, and disconnected to the top edge. The rim portion comprises an internal surface facing towards the body portion, an external surface, opposite to the internal surface, and a top end surface connected to the internal surface and located at one end of the rim portion that is close to the top edge. A sliding groove is defined in the rim portion. The sliding groove is recessed from the internal surface in a direction towards the external surface, and further extends to the top end surface. When the protective case is sleeved at the outer side of the mobile terminal, a portion of the rim portion that is connected to the first straight edge is attached to one of the pair of side end faces, a portion of the rim portion that is connected to the second straight edge is attached to the other of the pair of side end faces; the slider is capable of extending or retracting relative to the top edge, and a gap is defined between a groove wall in the sliding groove and the slider.

BRIEF DESCRIPTION OF DRAWINGS

In order to more clearly illustrate the technical solutions of the present disclosure, the drawings to be used in the embodiments will be briefly described below. It is obvious that the drawings in the following description are only some embodiments of the present disclosure. For those skilled in the art, other drawings can be obtained based on these drawings without paying any creative effort.

DETAILED DESCRIPTION

Figure 1:
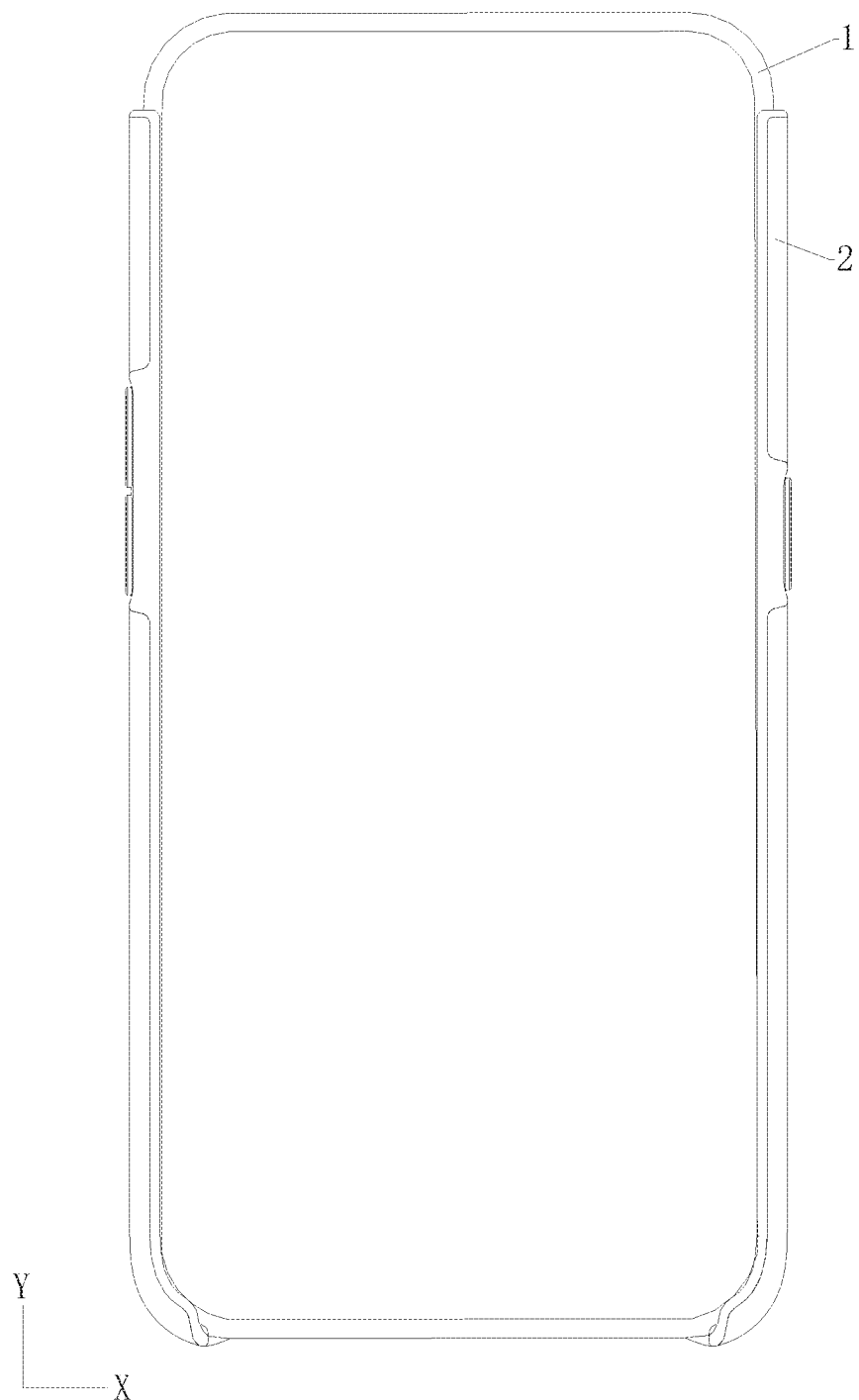
FIG. 1 is a schematic structural view of an electronic device according to some embodiments of the present disclosure.

The technical solutions in the embodiments of the present disclosure will be described below with reference to the drawings in drawings in the embodiments of the present disclosure. Apparently, the embodiments described herein are only some exemplary embodiments, not all the embodiments. Based on the embodiments described in the present disclosure, those skilled in the art may acquire all other embodiments without any creative efforts. All these shall be covered within the protection scope of the present disclosure.

Furthermore, in the description of the embodiments of the present disclosure, the description of the following embodiments is provided with reference to the accompanying drawings for illustrating specific implementations which may be implemented in the present disclosure. Directional terms recited in the present disclosure, such as "top", "bottom", "front", "rear", "left", "right", "inner", "outer", "side", and the like, refer to the orientations in the accompanying drawings. Thus, the directional terms used here are only for better and more clearly describing and understanding the present disclosure, and are not intended to indicate or imply that the devices or the elements are disposed to locate at the specific directions or are structured and performed in the specific directions, which could not to be understood as limiting the present disclosure.

In the present disclosure, it should be noted that, unless specified or limited, otherwise, terms "mounted", "connected", "connected", "disposed", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the description of the present disclosure, it should be noted that, "a plurality of" means two or more, unless specified otherwise. If the term "process" appears in this specification, it means not only an independent process, but also when it is not clearly distinguishable from other processes, it is included in the term as long as the intended function of the process can be realized. In addition, the numerical range represented by "to" in the present disclosure is a range in which the numerical values described before and after "to" are respectively included as a minimum value and a maximum value. In the drawings, elements that are similar or identical in structure are denoted by the same reference numerals.

In one aspect, a protective case for a mobile terminal is provided in some embodiments of the present disclosure. The protective case for a mobile terminal comprises a body portion and a rim portion. The body portion has a periphery. The periphery comprises a first straight edge, a second straight edge opposite to the first straight edge, and a top edge connected between the first straight edge and the second straight edge. The rim portion is fixed to the periphery of the body portion. The rim portion is connected to the first straight edge and the second straight edge, and disconnected to the top edge. The rim portion comprises an internal surface facing towards the body portion, an external surface, opposite to the internal surface, and a top end surface connected to the internal surface and located at one end of the rim portion that is close to the top edge. A sliding groove is defined in the rim portion. The sliding groove is recessed from the internal surface in a direction towards the external surface, and further extends to the top end surface.

In some embodiments, the rim portion comprises a first rim portion connected to the first straight edge and a second rim portion connected to the second straight edge; each of the first rim portion and the second rim portion defines the sliding groove.

In some embodiments, a clearance groove is defined on the internal surface at a position corresponding to an insulating portion of the mobile terminal, the clearance groove is recessed from the internal surface in a direction towards the external surface. The clearance groove communicates with the sliding groove and is located at one side of the sliding groove that is away from the top edge.

In some embodiments, the periphery of the body portion comprises: a bottom edge, disposed opposite to the top edge, wherein a first line connecting two end points of the top edge is substantially perpendicular to the first straight edge or the second straight edge, and a second line connecting two end points of the bottom edge is substantially perpendicular to the first straight edge or the second straight edge; a first transitional curved edge, connected between the first straight edge and the top edge, and disconnected to rim portion; a second transitional curved edge, connected between the top edge and the second straight edge, and disconnected to rim portion; a third transitional curved edge, connected between the first straight edge and the bottom edge, and connected to the rim portion; and a fourth transitional curved edge, connected between the second straight edge and the bottom edge, and connected to the rim portion.

In some embodiments, the top edge comprises a central region and two edge regions connected to two opposite ends of the central region; the central region is recessed in a direction towards a middle of the body portion with respect to the two edge regions.

In some embodiments, the rim portion comprise: a first shell, fixed to the periphery of the body portion; and a second shell, fixed to an inner side of the first shell, such that the second shell is sandwiched between the first shell and the mobile terminal when the mobile terminal is received in the protective case; wherein the first shell is made of material having a strength greater than a strength of material of the second shell; the top end surface and the internal surface are formed on the second shell.

In some embodiments, the body portion and the rim portion cooperatively define a receiving space configured to receive the mobile terminal. The first shell defines a notch; a part of the second shell is embedded in the notch to form a button portion, and a cap is arranged on the button portion and disposed corresponding to a button of the mobile terminal; the cap protrudes out of the notch. A recess is defined in the cap and recessed from a side of the second shell that faces towards the receiving space to another side of the second shell that faces away from the receiving space; the recess has a configuration matching with that of the button.

In some embodiments, the button portion has a first outer surface facing away from the receiving space, and the first shell has a second outer surface facing away from the receiving space; the first outer surface of the button portion is spliced with the second outer surface of the first shell.

In some embodiments, the first shell has an outer peripheral edge that is disconnected to the body portion, and the second shell wraps the outer peripheral edge In another aspect, a protective case for a mobile terminal is provided in some embodiments of the present disclosure. The mobile terminal comprises a middle frame, a slider, and an electronic component. The middle frame comprises a front end face, a rear end face opposite to the front end face, a left end face, a right end face disposed opposite to the left end face, a top end face, and a bottom end face disposed opposite to the top end face. Each of the left end face and the right end face is located between the top end face and the bottom end face; each of the top end face and the bottom end face is located between the left end face and the right end face. The slider is slidable relative to the middle frame and has a first position and a second position. The slider comprises a front side surface, a rear side surface disposed opposite to the front side surface, a left-side surface, a right-side surface disposed opposite to the left-side surface, a top surface, and a bottom surface disposed opposite to the top surface. Each of the left-side surface and the right-side surface is located between the top surface and the bottom surface; each of the top surface and the bottom surface is located between the left-side surface and the right-side surface. The electronic component is disposed in the slider. When the slider is in the first position, the electronic component is hidden in the middle frame, the left-side surface is substantially flush with the left end face, the right-side surface is substantially flush with the right end face, and the top surface is substantially flush with the top end face; when the slider is in the second position, the electronic component is exposed out of the middle frame. The protective case comprises a body portion, a first rim portion connected to the body portion, and a second rim portion disposed opposite to the first rim portion and connected to the body portion. The body portion is located between the first rim portion and the second rim portion; the body portion, the first rim portion, and the second rim portion define a receiving space configured to receive the mobile terminal. A surface of each of the first rim portion and the second rim portion that faces towards the receiving space defines a sliding groove, and the sliding groove extends through an edge of the first rim portion or an edge of the second rim portion. When the mobile terminal is received in the receiving space, the first rim portion is attached to the left end face, the second rim portion is attached to the right end face, and the body portion is attached to the rear end face. When the slider is switched between the first position and the second position, the left-side surface and the right-side surface are respectively movable in the sliding groove without contacting with the first rim portion and the second rim portion.

In some embodiments, at least one of the first rim portion and the second rim portion comprises a first shell and a second shell; the first shell is integrally formed with the body portion, and the second shell is disposed at one side of the first shell that faces towards the receiving space.

In some embodiments, the body portion and the first shell are made of KEVLAR; the second shell is made of TPU.

In some embodiments, the second shell wraps an edge of the first shell.

In some embodiments, at least one of the first rim portion and the second rim portion defines a notch at a position corresponding to a button of the mobile terminal, and the second shell comprises a cap protruding out of the notch; the cap is disposed corresponding to the button. A recess is defined in the cap. The recess is recessed from one side of the second shell that faces towards the receiving space to another side of the second shell that faces away from the receiving space; the recess has a configuration matching with that of the button.

In some embodiments, the body portion comprises: a top end portion, protruding outwardly from one ends of the first rim portion and the second rim portion, such that a first opening is defined in the top end portion; a bottom end portion, disposed opposite to the top end portion, wherein the other end of the first rim portion and the other end of the second rim portion extend towards to each other along the bottom end portion, such that a second opening is defined in the bottom end portion; a left end portion, connected between the top end portion and the bottom portion; and a right end portion, disposed opposite to the left end portion, and connected between the top end portion and the bottom end portion. The first rim portion is connected to the left end portion, and the second rim portion is connected to the right end portion. A maximum width of the first opening in a width direction of the protective case is greater than a maximum width of the second opening in the width direction of the protective case.

In a further aspect, an electronic device is provided in some embodiments of the present disclosure. The electronic device comprises a mobile terminal and a protective case for the mobile terminal. The protective case is capable of being detachably sleeved at an outer side of the mobile terminal. The mobile terminal comprises a middle frame and a slider. The middle frame comprises a pair of side end faces and a top end face connected between the pair of side end faces. The top end face defines a receiving groove penetrating through the pair of side end faces. The slider is slidable relative to the middle frame, such that the slider is capable of extending out of or retracting into the receiving groove. The protective case for a mobile terminal comprises a body portion and a rim portion. The body portion has a periphery. The periphery comprises a first straight edge, a second straight edge opposite to the first straight edge, and a top edge connected between the first straight edge and the second straight edge. The rim portion is fixed to the periphery of the body portion. The rim portion is connected to the first straight edge and the second straight edge, and disconnected to the top edge. The rim portion comprises an internal surface facing towards the body portion, an external surface, opposite to the internal surface, and a top end surface connected to the internal surface and located at one end of the rim portion that is close to the top edge. A sliding groove is defined in the rim portion. The sliding groove is recessed from the internal surface in a direction towards the external surface, and further extends to the top end surface. When the protective case is sleeved at the outer side of the mobile terminal, a portion of the rim portion that is connected to the first straight edge is attached to one of the pair of side end faces, a portion of the rim portion that is connected to the second straight edge is attached to the other of the pair of side end faces; the slider is capable of extending or retracting relative to the top edge, and a gap is defined between a groove wall in the sliding groove and the slider.

In some embodiments, the middle frame of the mobile terminal comprises an insulating portion and a plurality of conductive portions that are separated from each other by the insulating portion; the internal surface defines a recessed clearance groove at a position corresponding to the insulating portion; the clearance groove is recessed from the internal surface in a direction towards the external surface; when the protective case is sleeved at the outer side of the mobile terminal, the clearance groove is disposed corresponding to the insulating portion.

In some embodiments, the mobile terminal comprises a rear cover fixed to the middle frame, and the rear cover has a top edge facing towards the top end face; the top edge comprises an intermediate portion and two edge portions connected to two opposite ends of the intermediate portion; the intermediate portion is recessed toward a middle of the rear cover relative to the two edge portions; the top edge of the protective case has a same shape as the top edge.

In some embodiments, the rim portion comprises: a first shell, fixed to the periphery of the body portion; and a second shell, fixed to an inner side of the first shell. The first shell is made of material having a strength greater than a strength of material of the second shell. The top end surface and the internal surface are formed on the second shell. When the protective case is sleeved at the outer side of the mobile terminal, the second shell is located between the first shell and the mobile terminal.

In some embodiments, a button is arranged on the mobile terminal; the first shell defines a notch; a part of the second shell is embedded in the notch to form a button portion, and a cap is arranged on the button portion and disposed corresponding to the button; the cap protrudes out of the notch. A recess is defined in the cap and recessed from a side of the second shell that faces towards the receiving space to another side of the second shell that faces away from the receiving space; the recess has a configuration matching with that of the button. When the protective case is sleeved at the outer side of the mobile terminal, the button is received in the recess and wrapped by the cap.

Figure 2:
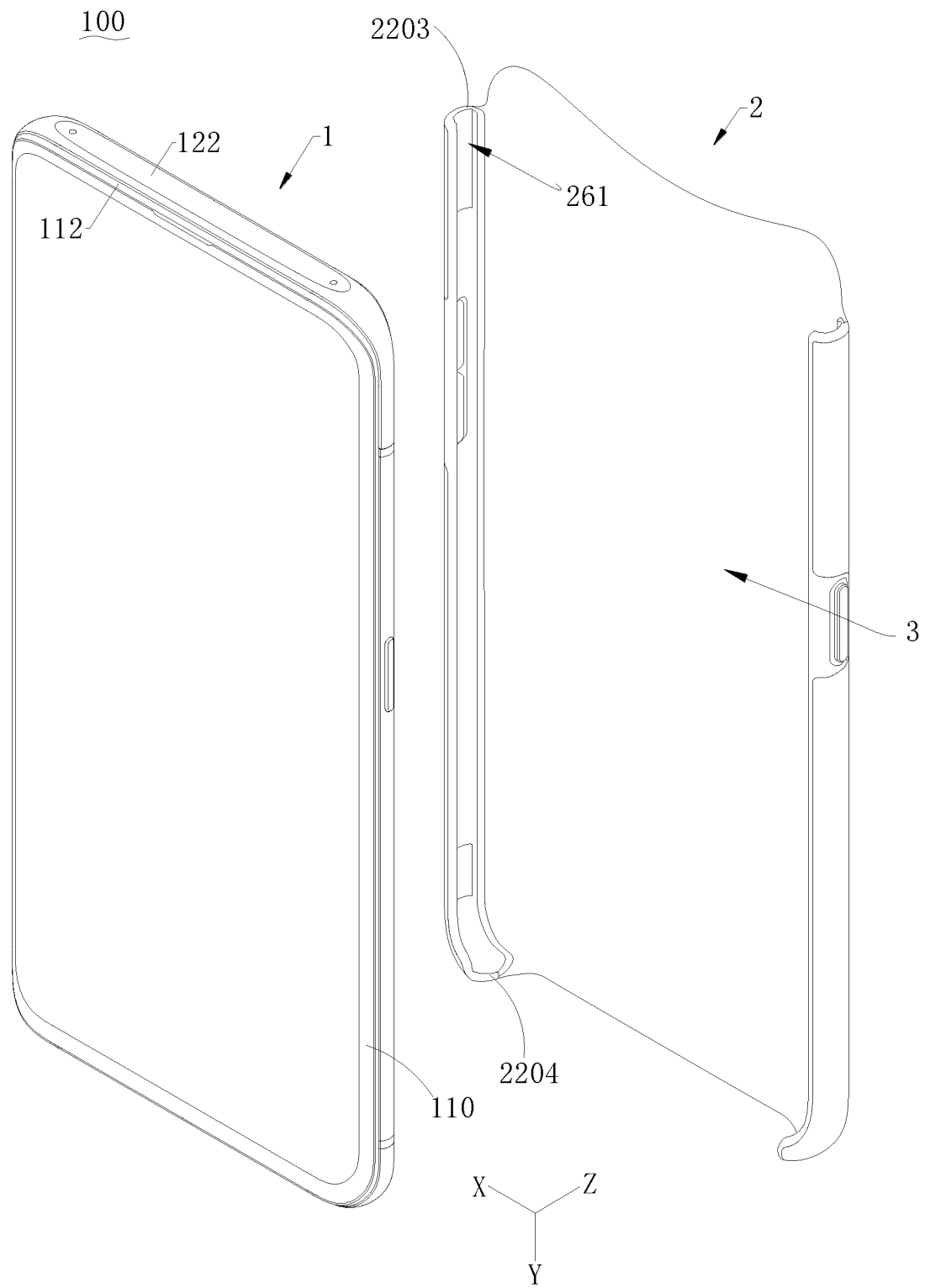
FIG. 2 is a schematic structural view of the electronic device shown in FIG. 1, wherein the electronic device is in another use state.

As shown in FIG. 1 and FIG. 2, FIG. 1 is a schematic structural view of an electronic device 100 according to some embodiments of the present disclosure; FIG. 2 is a schematic structural view of the electronic device 100 shown in FIG. 1, wherein the electronic device is in another use state.

The electronic device 100 may include a mobile terminal 1 and a protective case 2 for the mobile terminal 1. The protective case 2 may be capable of being detachably sleeved at an outer side of the mobile terminal 1. The protective case 2 may have a shape matching with that of an outer contour of the mobile terminal 1, such that the protective case 2 may be better sleeved on the mobile terminal 1.

In some embodiments, when the protective case 2 is sleeved on the mobile terminal 1, the mobile terminal 1 may be protected, and the risk that the mobile terminal 1 is worn or cracked may be reduced. The protective case 2 may also be detached from the mobile terminal 1 according to user requirements.

For convenience of description, the mobile terminal 1 may be defined with reference to the viewing angle shown in FIG. 2. As shown in FIG. 2, the mobile terminal 1 may have a width direction X, a length direction Y, and a thickness direction Z. The length direction Y may be substantially perpendicular to the width direction X, and the thickness direction Z may be substantially perpendicular to the width direction X and the length direction Y. Since the protective case 2 may be sleeved on the mobile terminal 1, a length direction of the protective case 2 may be the direction in which the length direction Y of the mobile terminal 1 is located, the width direction of the protective case 2 may be the direction in which the width direction X of the mobile terminal 1 is located, and the thickness direction of the protective case 2 may be the direction in which the thickness direction Z of the mobile terminal 1 is located. As shown in FIG. 1, the length direction of the electronic device 100 may be the direction in which the length direction Y of the mobile terminal 1 is located, the width direction of the electronic device 100 may be the direction in which the width direction X of the mobile terminal 1 is located, and the thickness direction of the electronic device 100 may be the direction in which the thickness direction Z of the terminal 1 is located.

In the present disclosure, a communication terminal configured to communicate via a wireless interface may be referred to as a "wireless communication terminal", a "wireless terminal", or a "mobile terminal". Wireless interface methods include, but are not limited to, a cellular network, a wireless local area network (WLAN), a digital television network such as DVB-H network, a satellite network, an AM-FM broadcast transmitter, and the like. Examples of the mobile terminal 1 may include, but be not limited to, the following electronic device 100: (1) a satellite phone or a cellular phone; (2) a personal communication system (PCS) terminal that can combine cellular radiotelephone with data processing, fax, and data communication capabilities; (3) a radiotelephone, a pager, an internet/intranet access, a web browser, a notepad, a calendar, and a personal digital assistant (PDA) equipped with global positioning system (GPS) receiver; (4) a conventional laptop and/or a palmtop receiver; (5) a conventional laptop and/or palmtop radiotelephone transceiver, and the like.

Figure 3:
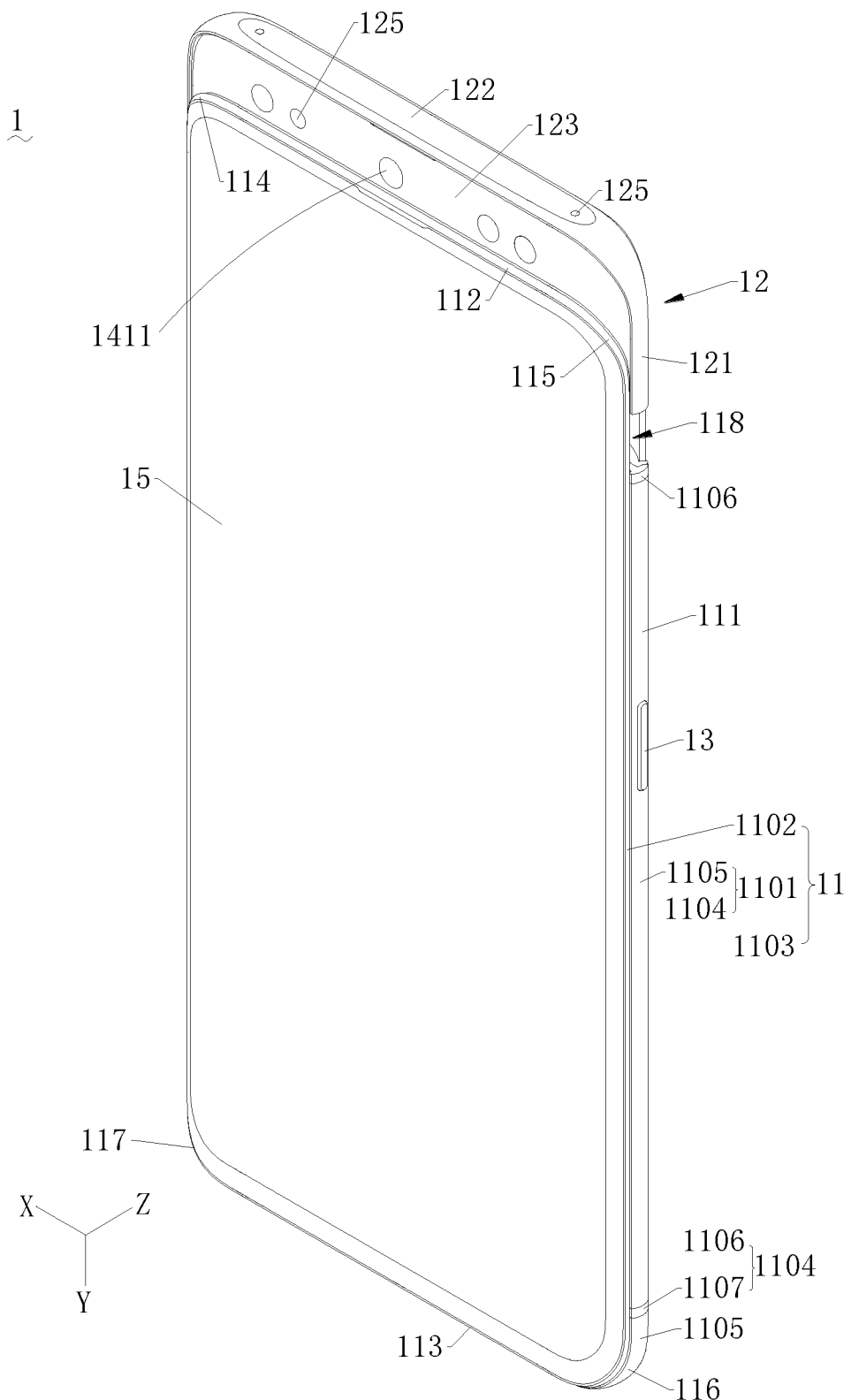
FIG. 3 is a schematic structural view of a mobile terminal shown in FIG. 2 in another use state.
Figure 4:
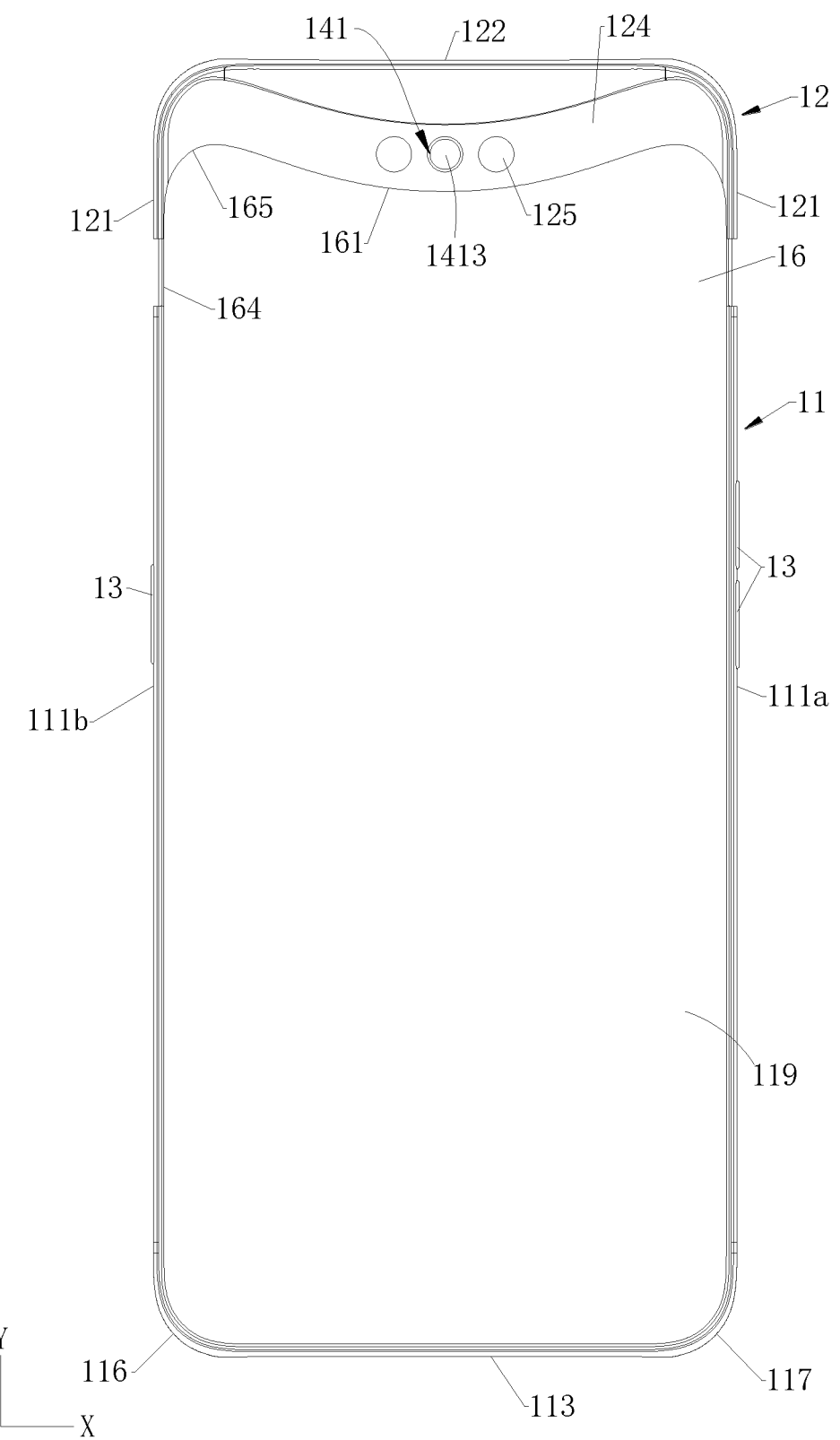
FIG. 4 is a schematic structural view of the mobile terminal shown in FIG. 3, but viewed from another angle.
Figure 5:
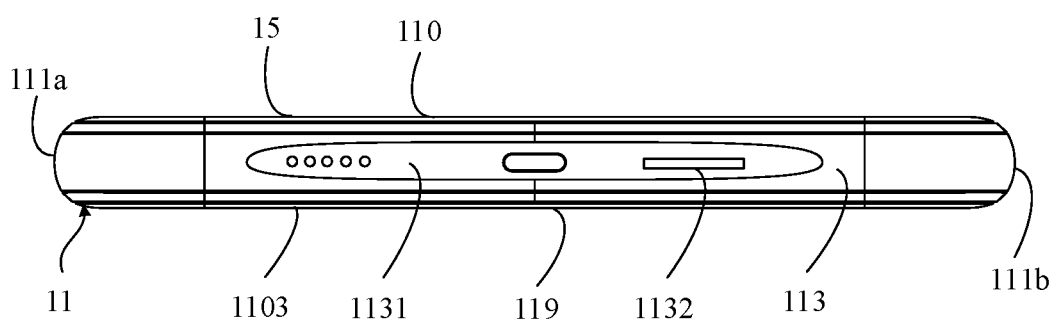
FIG. 5 is a bottom view of the mobile terminal shown in FIG. 2.

As shown in FIGS. 3-5, FIG. 3 is a schematic structural view of a mobile terminal 1 shown in FIG. 2 in another use state, FIG. 4 is a schematic structural view of the mobile terminal 1 shown in FIG. 3, but viewed from another angle, and FIG. 5 is an exploded view of the mobile terminal 1 shown in FIG. 3.

The mobile terminal 1 may include a middle frame 11 and a slider 12.

The middle frame 11 may include a pair of side end faces 111 and a top end face 112 connected between the pair of side end faces 111. The middle frame 11 may also include a bottom end face 113. The bottom end face 113 may be disposed opposite to the top end face 112, and connected between the pair of side end faces 111. A button 13 may be provided on the at least one of side end faces 111 of the mobile terminal 1. The button 13 may be a power button, a volume button, and the like. At least one of a main board, a battery, a speaker, a microphone, and an electrical connector may be disposed inside the middle frame 11 of the mobile terminal 1. The bottom end face 113 may define one or more of a sound-output hole corresponding to the speaker, a sound-input hole corresponding to the microphone, and a connecting through-hole corresponding to the electrical connector.

In some embodiments, the side end faces 111 may include a left end face 111a and a right end face 111b disposed opposite to the left end face 111a. The left end face 111a may be disposed between the top end face 112 and the bottom end face 113. The right end face 111b may be disposed between the top end face 112 and the bottom end face 113. The top end face 112 may be disposed between the left end face 111a and the right end face 111b. The bottom end face 113 may be disposed between the left end face 111a and the right end face 111b.

In some embodiments, the middle frame 11 may also include a front end face 110, and a rear end face 119 opposite to the front end face 110. The front end face 110 and the rear end face 119 may each be connected to the side end faces 111 (including the left end face 111a and the right end face 111b).

The middle frame 11 may further include a first transitional curved surface 114, a second transitional curved surface 115, a third transitional curved surface 116, and a fourth transitional curved surface 117. In some embodiments, the curved surfaces 114, 115, 116, and 117 may be in shape of an arc. The first transitional curved surface 114 may be connected between the top end face 112 and one of the pair of side end faces 111. The second transitional curved surface 115 may be connected between the top end face 112 and the other of the pair of side end faces 111. The third transitional curved surface 116 may be connected between the bottom end face 113 and one of the pair of side end faces 111. The fourth transitional curved surface 117 may be connected between the bottom end face 113 and the other of the pair of side end faces 111.

The top end face 112 may define a receiving groove 118. The receiving groove 118 may penetrate through the pair of side end faces 111. That is, the receiving groove 118 may extend from one of the pair of side end faces 111 to the other of the pair of side end faces 111. The receiving groove 118 may also extend to the first transitional curved surface 114 and the second transitional curved surface 115. The slider 12 may be slidable relative to the middle frame 11, such that the slider 12 may extend out of or retract into the receiving groove 118. In other words, the slider 12 may slide in the receiving groove 118 and relative to the middle frame 11. In the present disclosure, the slider 12 may be movable in the length direction Y of the mobile terminal 1.

The slider 12 may include a pair of side surfaces 121 and a top surface 122 connected between the pair of side surfaces 121. In some embodiments, when the slider 12 retracts into the receiving groove 118, one of the pair of side surfaces 121 may be spliced with one of the pair of side end faces 111, the other of the pair of side surfaces 121 may be spliced with the other of the pair of side end faces 111, and the top surface 122 may be spliced with the top end face 112. When the slider 12 extends out of the receiving groove 118, the top surface 122 may protrude relative to the top end face 112.

In the present disclosure, as shown in FIG. 3, when the top surface 122 of the slider 12 protrudes to a certain distance relative to the top end face 112 of the middle frame 11, it may be defined that the slider 12 completely extends out of the receiving groove 118 of the middle frame 11. In other words, the slider 12 is in an extension state at this time. As shown in FIG. 2, when the top surface 122 of the slider 12 is spliced with the top end face 112 of the middle frame 11, it may be defined that the slider 12 is completely received in the receiving groove 118 of the middle frame 11. In other words, the slider 12 is in a retraction state at this time.

Figure 6:
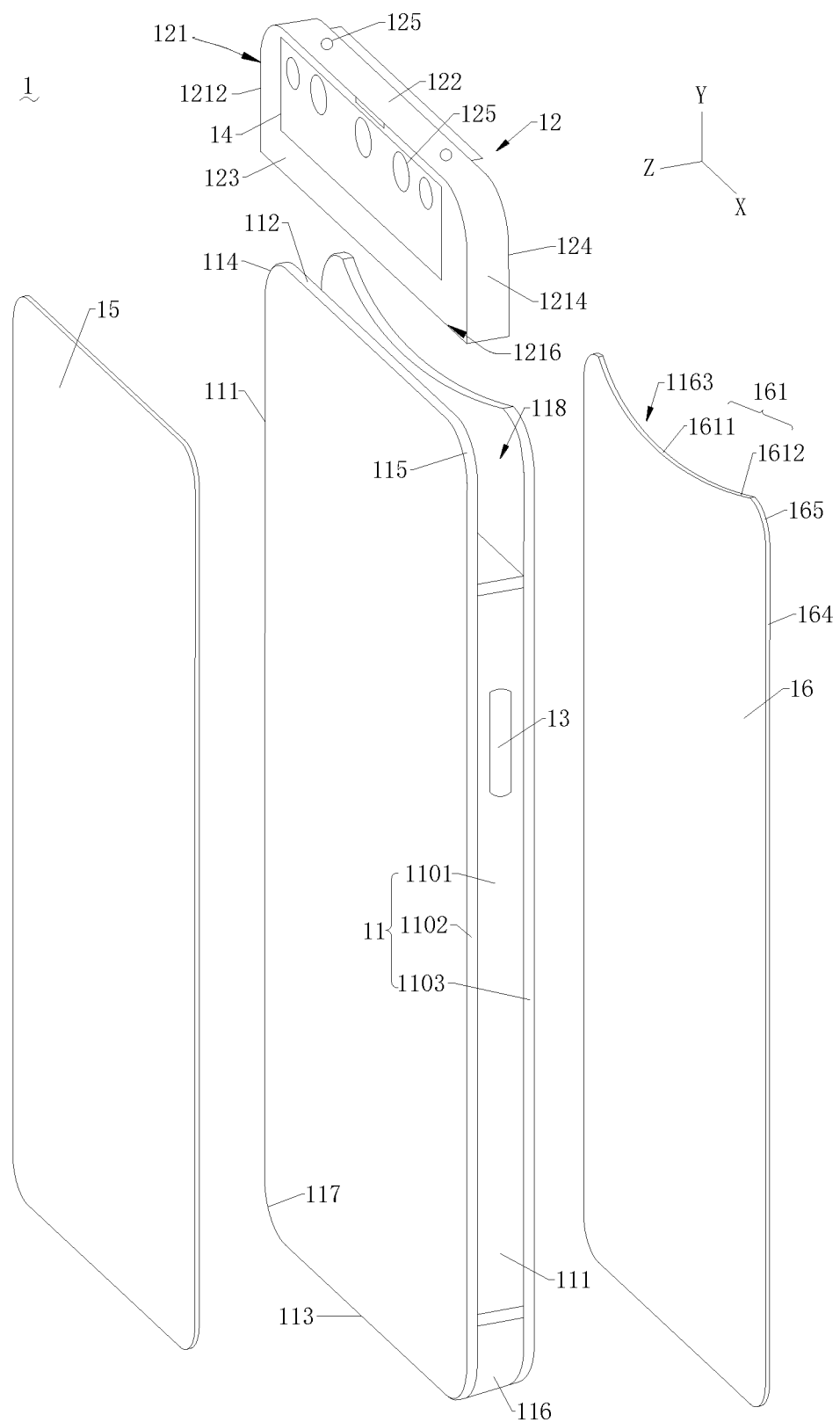
FIG. 6 is an exploded view of the mobile terminal shown in FIG. 3.

As shown in FIG. 6, an electronic assembly 14 may be disposed in the slider 12. The electronic assembly 14 may include one or more electronic devices or modules or components. The devices or modules may include, but be not limited to, a camera module, a face recognition module, an iris recognition module, a receiver (also called as an earpiece), a microphone, an antenna module, a light sensor module, and a light sensor. The camera module may be configured for shooting (taking photos or videos). The face recognition module may be configured to acquire a depth image of colors of a user's face. The iris recognition module may be configured to acquire an iris image of the user. The receiver may be configured to convert an audio electrical signal into a sound signal. The microphone may be configured to convert a sound signal into an electrical signal. The antenna module may be configured to transmit and receive electromagnetic waves. The light sensor module may be configured to sense ambient brightness and a proximity distance of an object. The light sensor module may be a three-in-one module of an infrared emitter, a proximity sensor, and an ambient light sensor. The light sensor may be configured to detect the intensity of the ambient light.

In some embodiments, the electronic assembly 14 may include a camera module 141. As shown in FIGS. 3-4, the camera module 141 may be disposed on the slider 12. The camera module 141 may have a light incident surface. Ambient light may pass through the light incident surface and further enter a photosensitive element of the camera module 141.

As shown in FIGS. 3-6 together, the slider 12 may further include a front surface 123, a rear surface 124 opposite to the front surface 123, a side surface 121 connected between the front surface 123 and the rear surface 124, and a bottom surface 1216 opposite to the top surface 122. The front surface 123 may be connected between the pair of side surfaces 121 and connected to the top surface 122. The rear surface 124 may be connected between the pair of side surfaces 121 and connected to the top surface 122. The side surface 121 may include a left-side surface 1212 and a right-side surface 1214 opposite to the left-side surface 1212. The left-side surface 1212 may be located between the top surface 122 and the bottom surface 1216. The right-side surface 1214 may be located between the top surface 122 and the bottom surface 1216. The top surface 122 may be located between the left-side surface 1212 and the right-side surface 1214. The bottom surface 1216 may be located between the left-side surface 1212 and the right-side surface 1214. The receiving groove 118 may extend through the left end face 111a, the right end face 111b and the top end face 112. The slider 12 may be slidably disposed in the receiving groove 118 and may have a first position and a second position. As shown in FIG. 1, when the slider 12 is in the first position, the camera module 141 may be received in the receiving groove 118, and the light incident surface may be hidden by the middle frame 11. At this time, the left-side surface 1212 may be substantially flush with the left end face 111a, the right-side surface 1214 may be substantially flush with or at the same level with the right end face 111b, and the top surface 122 may be substantially flush with or at the same level with the top end face 112. As shown in FIG. 3 and FIG. 4, when the slider 12 is in the second position, the camera module 141 may be exposed out of the receiving groove 118, and the light incident surface may be exposed out of the middle frame 11.

Further, in some embodiments, the mobile terminal 1 may be substantially in shape of a rectangular block. The left end face 111a and the right end face 111b may be respectively disposed at two opposite ends in a width direction of the rectangular block, and the top end face 112 and the bottom end face 113 may be respectively located at two opposite ends in a length direction of the rectangular block. In some embodiments, the middle frame 11 may include a display screen 15. The display screen 15 may be disposed between the left end face 111a and the right end face 111b, and between the top end face 112 and the bottom end face 113. The front end face 110 may be completely or partially formed by a display area of the display screen 15.

As shown in FIG. 5, in some embodiments, the middle frame 11 may define a recessed groove 1131, the recessed groove 1131 may be recessed from the bottom end face 113. A bottom wall in the recessed groove 1131 may define a card slot 1132. The card slot 1132 may be configured to receive a card holder, and a SIM card or a memory card may be inserted into the middle frame 11 by using the card holder.

At least one transmission portion 125 may be arranged on the slider 12. The transmission portion 125 may be arranged on at least one of the side surface 121, the top surface 122, the front surface 123, or the rear surface 124. The transmission portion 125 arranged on the side surface 121 or the top surface 122 may be always exposed outside and will not be blocked by the middle frame 11. In this way, when the slider 12 extends out or retracts back, the electronic assembly 14 corresponding to the transmission portion 125 arranged on the side surface 121 or the top surface 122 may always be able to be interacted with the user. The transmission portion 125 on the front surface 123 or the rear surface 124 may be exposed out when the slider 12 extends out, such that the electronic assembly 14 corresponding to the transmission portion 125 on the front surface 123 or the rear surface 124 may be interacted with the user. However, when the slider 12 retracts back into the middle frame, the transmission portion 125 on the front surface 123 or the rear surface 124 may be blocked by the middle frame 11, such that the electronic assembly 14 corresponding to the transmission portion 125 in the front surface 123 or the rear surface 124 will not be interacted with the user. The configuration of the transmission portion 125 may match with a type of a signal that is transmitted in the transmission portion 125. For example, when the transmission signal is an optical signal, the transmission portion 125 may be a through-hole or made of transparent material.

The middle frame 11 may include a rim 1101, and a front housing 1102 and a rear housing 1103 which are disposed on two opposite sides of the rim 1101. The rim 1101 in this embodiment may include the left end face 111a, the right end face 111b, the top end face 112, and the bottom end face 113. The rear end face 119 may be formed on the rear housing 1103, and the display screen 15 may be connected to the front housing 1102. The front housing 1102 may be made of glass.

The front housing 1102, a top end of the rim 1101, and the rear housing 1103 collectively enclose the receiving groove 118. The top end of the rim 1101 may be recessed relative to a top end of the front housing 1102 and a top end of the rear housing 1103. In other words, a length of the rim 1101 in the length direction Y is less than a length of the front housing 1102 and a length of the rear housing 1103 in the length direction Y. The front surface 123 of the slider 12 may face towards the front housing 1102, and the rear surface 124 of the slider 12 may face towards the rear housing 1103. When the slider 12 is received in the receiving groove 118, the front housing 1102, the slider 12 and the rear housing 1103 form a sandwich-like structure, such that when the mobile terminal 1 is falling down or crashed by an external force, the front housing 1102 and the rear housing 1103 may provide a protection to the slider 12 located between the front housing and the rear housing, thereby preventing a damage to the slider 12 and the electronic assembly 14 received in the slider 12.

The mobile terminal 1 may further include a drive mechanism (not shown in the drawings) and a guide mechanism (not shown in the drawings). The drive mechanism and the guide mechanism may be located in the middle frame 11. The drive mechanism may be connected to (including electrically connection and signal connection) a main board. The drive mechanism may be configured to drive the slider 12 to carry the electronic assembly 14 to move relative to the middle frame 11. The guide mechanism may be disposed between the slider 12 and the middle frame 11. The guide mechanism may be configured to provide a limitation to the slider 12, such that the slider 12 may move in the direction guided by the guide mechanism. In other words, the slider 12 may be slidable in the receiving groove 118 relative to the middle frame 11 via the drive mechanism. The guide mechanism may be disposed between the slider 12 and the middle frame 11, such that the slider 12 may extend out of or retract into the receiving groove 118 in the direction guided by the guide mechanism when driven by the drive mechanism. In some embodiments, the guide mechanism may guide the slider 12 to move in the length direction Y of the mobile terminal 1. One or more devices or modules may be arranged in the width direction X of the mobile terminal 1, such that the one or more devices or module may extend out of or retract into the receiving groove 118 at the same time or near time.

The mobile terminal 1 may also include a display screen 15. The display screen 15 may be mounted on the front housing 1102. The display screen 15 may be a touch display screen to achieve the display function and the touch function. The display screen 15 may include a glass cover and a display module fixed to the glass cover. The display module may be an organic light emitting diode display module or a liquid crystal display module.

In the present disclosure, the electronic assembly 14 is disposed in the slider 12, and the slider 12 is slidable in the receiving groove 118 relative to the middle frame 11. In this way, when it is necessary to use the electronic assembly 14, the electronic assembly 14 may slide out of the middle frame 11, such that the electronic assembly 14 may be unfolded relative to the display screen 15. In this way, the limitation to the screen ratio of the display screen 15 of the mobile terminal 1 due to the use of the electronic assembly 14 may be avoided, and thus the screen ratio of the mobile terminal 1 may be increased.

The mobile terminal 1 may include a rear cover 16 fixed to the middle frame 11. The rear cover 16 may be mounted on the rear housing 1103. The rear cover 16 may be a metal cover or a glass cover.

The rear cover 16 may have a top rim 161 that faces towards the top end face 112. The top rim 161 may include an intermediate portion 1611 and two edge portions 1612 connected to two opposite ends of the intermediate portion 1611. The intermediate portion 1611 may be recessed toward the middle of the rear cover 16 relative to the two edge portions 1612. At this time, the top rim 161 may define a window 1163 communicating with the receiving groove 118.

In some embodiments, since the rear cover 16 defines the window 1163, when the slider 12 extends out of the receiving groove 118 to a short distance, at least one transmission portion 125 located on the rear surface 124 of the slider 12 may be exposed from the window 1163. In this way, the device or module corresponding to the at least one transmission portion 125 may be interacted with the user; for example, the camera module may be used to perform shooting. Therefore, the window 1163 may be arranged in such a way that, the slider 12 slides a short distance when the slider 12 extends out, such that a reaction speed of some devices or modules may be increased, and an energy consumption of the mobile terminal 1 may be reduced.

In this case, the rear cover 16 may also have a side edge 164 and a transitional curved edge 165 connected between the side edge 164 and the top rim 161. The transitional curved edge 165 may be in shape of an arc. The side edge 164 may be disposed facing towards the side end face 111 of the middle frame 11. As shown in FIG. 5, a shape of the top end of the rear housing 1103 may match with a shape of the top rim 161 of the rear cover 16, and also match with a shape of the transitional curved edge 165.

As shown in FIG. 3, the middle frame 11 of the mobile terminal 1 may include the rim 1101. The rim 1101 may include an insulating portion 1104 and one or more conductive portions 1105 that are separated from each other by the insulating portion 1104. Herein, one or more insulating portions may be provided. Each of the one or more conductive portions 1105 may be made of electrically conductive material such as a metal. Two adjacent conductive portions 1105 separated from each other by the insulating portion 1104 may be insulated from each other. For example, as shown in FIG. 3, the rim 1101 may include four insulating portions 1104 and three conductive portions 1105. The three conductive portions 1105 may be separated from each other by the insulating portions 1104.

In some embodiments, the conductive portions 1105 may be used as a radiator of a part of the antenna module of the mobile terminal 1. In some other embodiments, the radiator may be fixed at an inner side of the rim 1101. The radiator may be disposed corresponding to the insulating portions 1104, and the insulating portions 1104 may act as a clearance region of the antenna radiation. In the present disclosure, the insulating effect provided by the insulating portion 1104 and between the two adjacent conductive portions 1105 which are separated from each other by the insulating portion 1104 may affect the signal transmission/reception quality of the antenna module in the mobile terminal 1.

As shown in FIG. 3, at least one insulating portion 1104 may be located at a top end of the rim 1101 that is near the receiving groove 118. For example, the insulating portion 1104 of the rim 1101 may include a top insulator 1106 near the top end face 112 of the middle frame 11 and a bottom insulator 1107 near the bottom end face 113 of the middle frame 11. The top insulator 1106 may be located at the top end of the rim 1101 that is near the receiving groove 118. In some embodiments, one or more top insulators 1106 may be provided. The mobile terminal 1 may include a top antenna module located inside the slider 12 and a bottom antenna module located inside the middle frame 11 and near the top end face 112. The top antenna module may be disposed corresponding to the top insulator 1106. Signals transmitted and received by the top antenna module may be transmitted through the top insulator 1106. The bottom antenna module may be disposed corresponding to the bottom insulator 1107. Signals transmitted and received by the bottom antenna module may be transmitted through the bottom insulator 1107.

Figure 7:
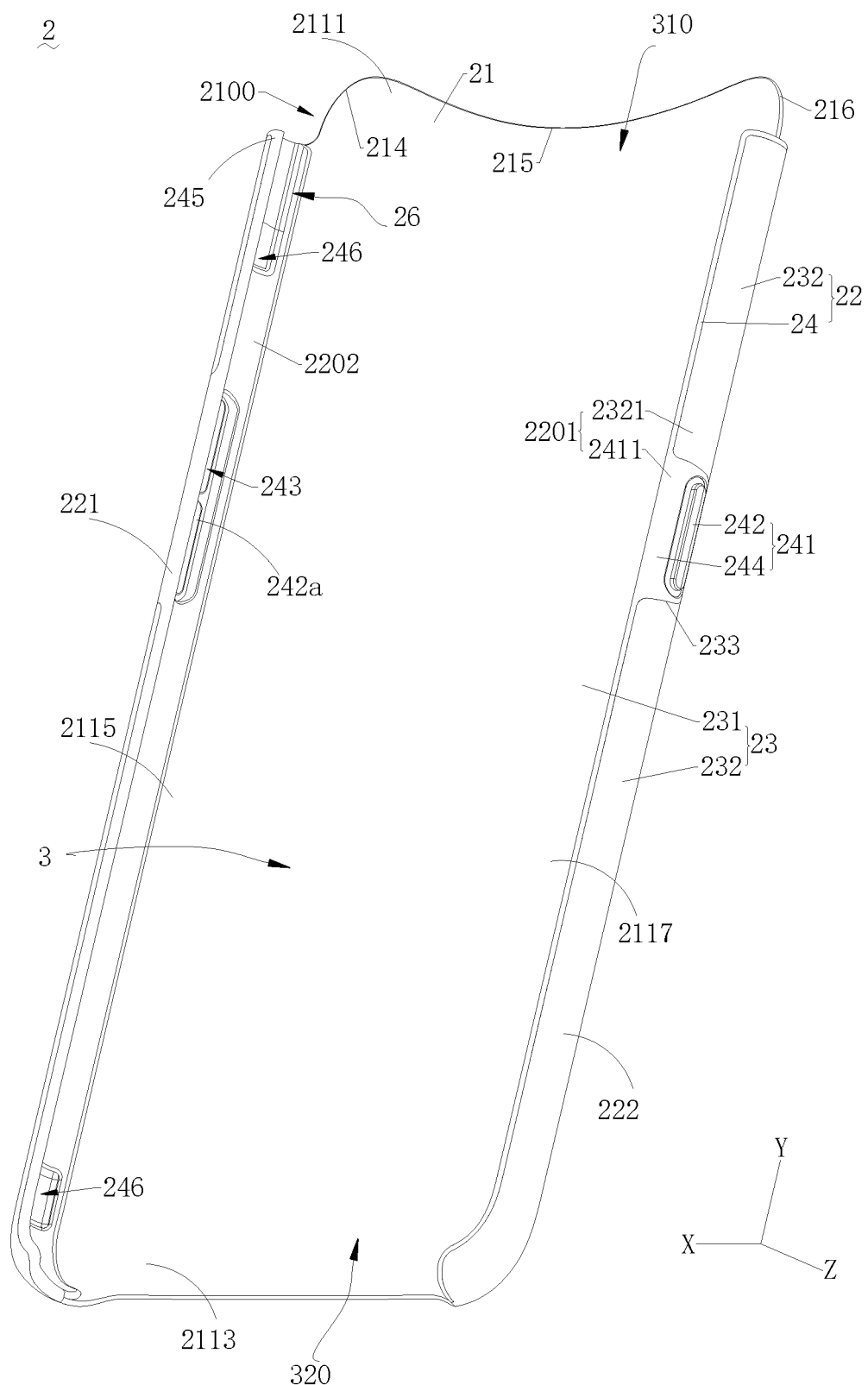
FIG. 7 is a schematic structural view of the protective case for the mobile terminal shown in FIG. 2, but viewed from another angle.
Figure 8:
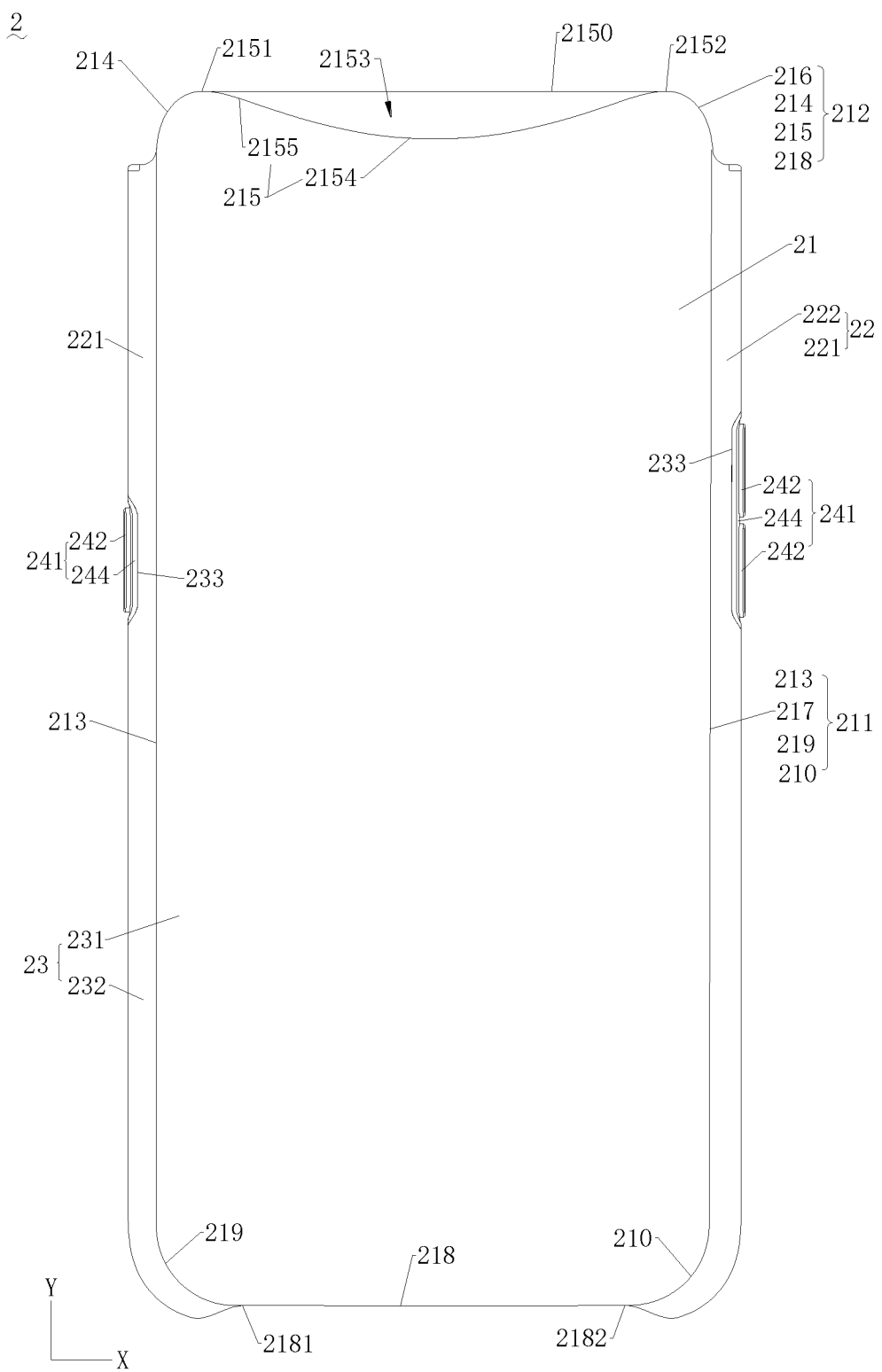
FIG. 8 is a schematic structural view of the protective case for the mobile terminal shown in FIG. 2, but viewed from yet another angle.
Figure 9:
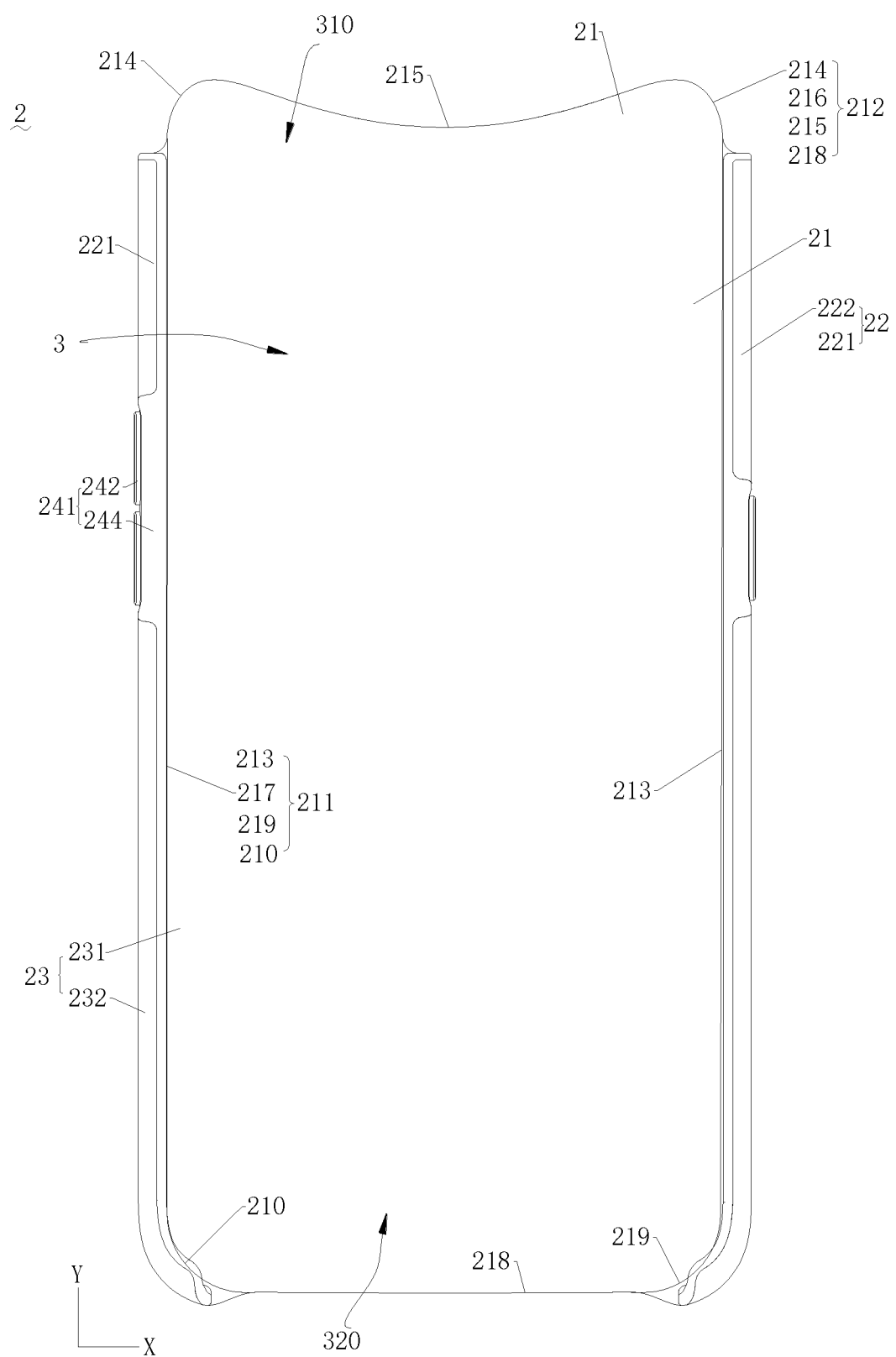
FIG. 9 is a schematic structural view of the protective case for the mobile terminal shown in FIG. 2, but viewed from still another angle.

As shown in FIGS. 7-9, FIG. 7 is a schematic structural view of the protective case 2 for the mobile terminal shown in FIG. 2, but viewed from another angle; FIG. 8 is a schematic structural view of the protective case 2 for the mobile terminal shown in FIG. 2, but viewed from yet another angle; FIG. 9 is a schematic structural view of the protective case 2 for the mobile terminal shown in FIG. 2, but viewed from still another angle.

The protective case 2 may include a body portion 21 and a rim portion 22. The rim portion 22 may be fixed to a periphery (211, 212) of the body portion 21. The periphery (211, 212) of the body portion 21 may include a connecting portion 211 connected to the rim portion 22 and a non-connecting portion 212 disconnected to the rim portion 22. In other words, the rim portion 22 is connected to the connecting portion 211 of the periphery (211, 212) of the body portion 21. The rim portion 22 is not connected to the non-connecting portions 212 of the periphery (211, 212) of the body portion 21.

In some embodiments, two rims portions 22 may be provided. The two rims portions 22 may be disposed opposite to each other. The body portion 21 may be substantially in shape of a rectangular block. Meanwhile, as shown in FIG. 6, the two rims portions 22 may be respectively connected to two opposite edges of the body portion 21. The body portion 21 may be located between the two rims portions 22. The body portion 21 and the rims portions 22 cooperatively define a receiving space 3 configured to receive the mobile terminal 1. After the mobile terminal 1 is disposed in the receiving space 3, one of the two rims portions 22 may be attached to the left end face 111a, the other of the two rims portions 22 may be attached to the right end face 111b of the mobile terminal 1, and the body portion 21 may be attached to the rear end face 119.

The periphery (211, 212) of the body portion 21 may further include a first straight edge 213, a second straight edge 217 opposite to the first straight edge 213, and a top edge 215 connected between the first straight edge 213 and the second straight edge 217. The first straight edge 213 may be substantially rectilinear, or may be slightly inclined or bent. The second straight edge 217 may be substantially rectilinear, or may be slightly inclined or bent. The first straight edge 213 may be substantially parallel to the second straight edge 217, or the first straight line 213 may be slightly inclined at an angle to the second straight line 217.

An extending direction of the top edge 215 may be substantially coincident with the direction directed from the first straight edge 213 to the second straight edge 217. In other words, a line connecting two end points (2151, 2152) of the top edge 215 may be substantially perpendicular to the first straight edge 213 or the second straight edge 217. The top edge 215 may be substantially a rectilinear edge or an edge substantially in shape of an arc.

The connecting portion 211 may include the first straight edge 213 and the second straight edge 217. That is to say, the first straight edge 213 and the second straight edge 217 are connected to the rim portion 22. The rim portion 22 may be connected to the first straight edge 213 and the second straight edge 217. The non-connected portion 212 may include the top edge 215. The rim portion 22 may be not connected to the top edge 215.

Figure 10:
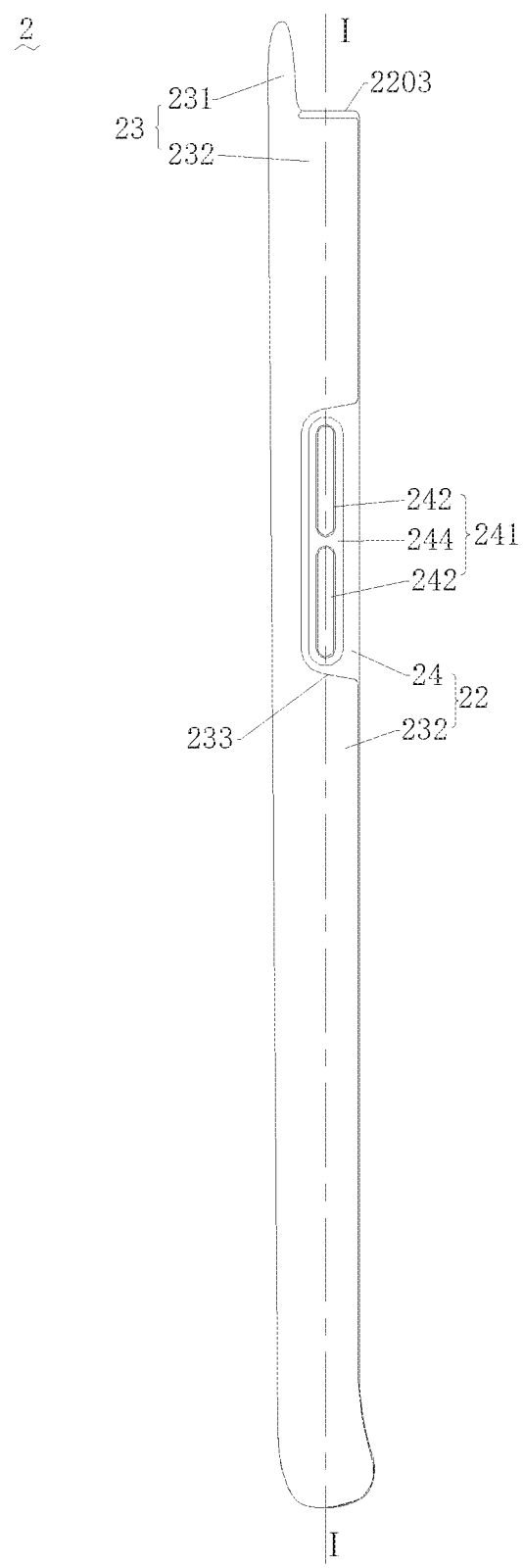
FIG. 10 is a schematic structural view of the protective case for the mobile terminal shown in FIG. 2, but viewed from a further angle.
Figure 11:
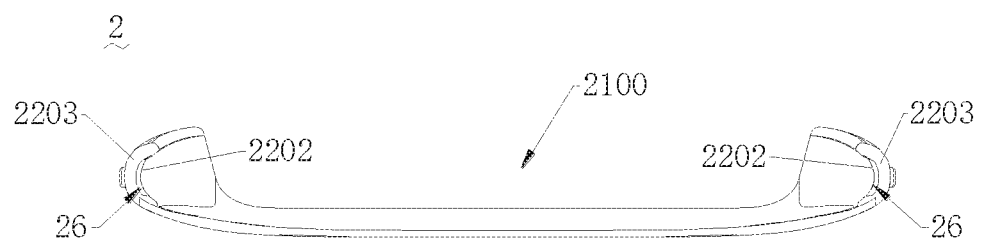
FIG. 11 is a schematic structural view of the protective case for the mobile terminal shown in FIG. 2, but viewed from still a further angle.
Figure 12:
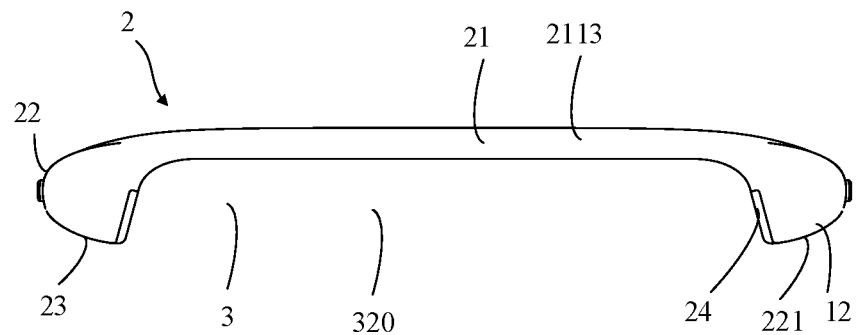
FIG. 12 is a schematic structural view of the protective case for the mobile terminal shown in FIG. 2, but viewed from still a further angle.
Figure 13:
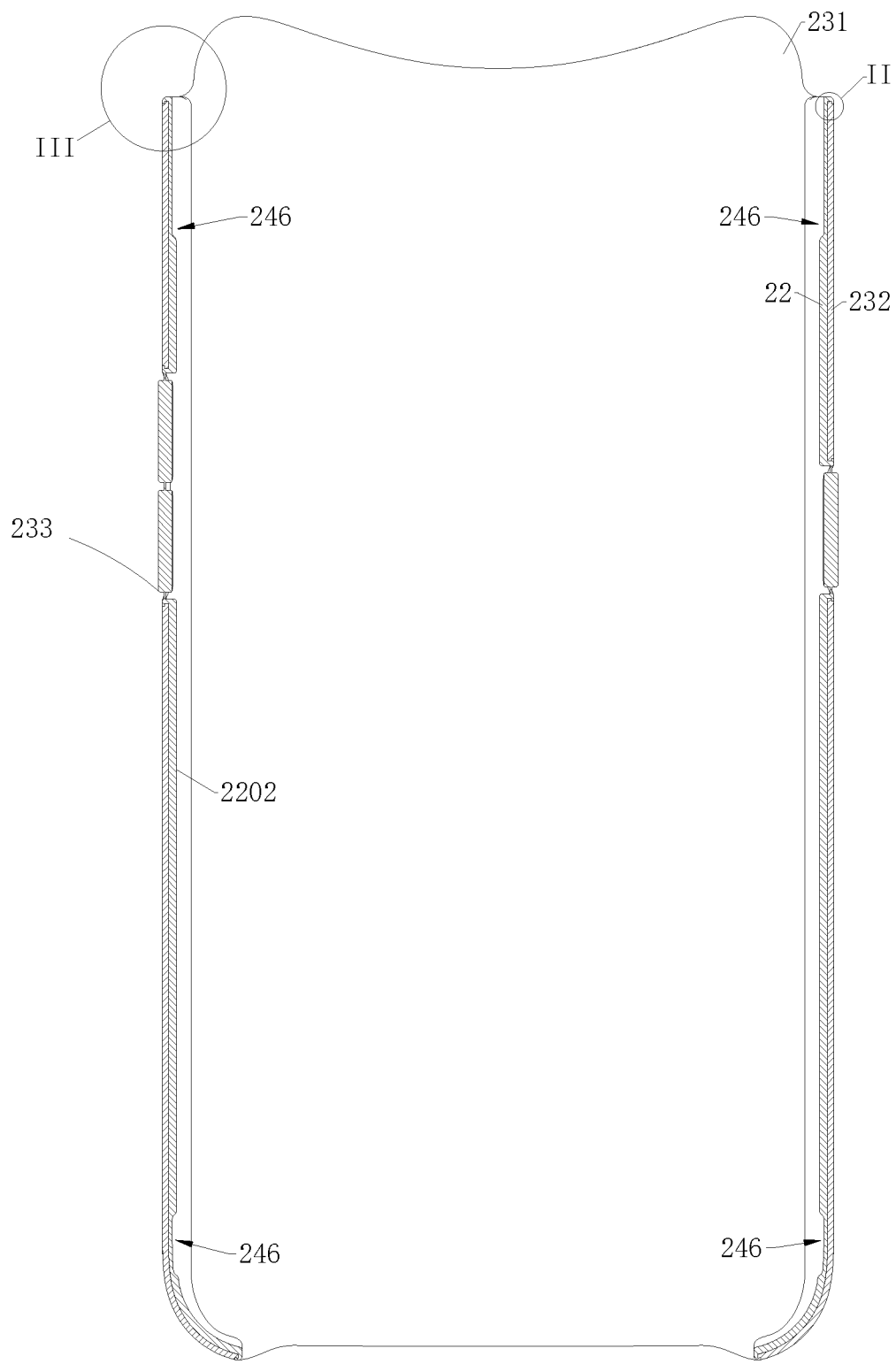
FIG. 13 is a cross-sectional view of the protective case for the mobile terminal shown in FIG. 10 taken along line I-I.

As further shown in FIGS. 7-13, FIG. 10 is a schematic structural view of the protective case 2 for the mobile terminal shown in FIG. 2, but viewed from a further angle; FIG. 11 is a schematic structural view of the protective case 2 for the mobile terminal shown in FIG. 2, but viewed from still a further angle; FIG. 12 is a schematic structural view of the protective case for the mobile terminal shown in FIG. 2, but viewed from still a further angle; FIG. 13 is a cross-sectional view of the protective case 2 for the mobile terminal shown in FIG. 10 taken along line I-I.

As shown in FIGS. 11-13 and FIG. 2, the rim portion 22 may include an internal surface 2202 facing towards the body portion 21, an external surface 2201 opposite to the internal surface 2202, and a top end surface 2203 facing towards the top edge 215, that is to say, the top end surface 2203 is located at one end of the rim portion 22 that is close to the top edge. The top end surface 2203 may be connected to the internal surface 2202. The rim portion 22 may further include a bottom end surface 2204 opposite to the top end surface 2203. The bottom end surface 2204 may be connected to the internal surface 2202, and located at the other end of the rim portion 22 that is away from the top edge 215. That is to say, the top end surface 2203 may be disposed closer to the top edge 215 than the bottom end surface 2204.

The top end surface 2203 may be formed on a portion of the rim portion 22 that is connected to the first straight edge 213 and a portion of the rim portion 22 that is connected to the second straight edge 217. The rim portion 22 may define a sliding groove 26. More specifically, in some embodiments, one or more sliding grooves 26 allowing the slider of the mobile terminal 1 to slide without contacting with the rim portion 22 may be defined in the rim portion 22. Each sliding groove 26 may extend to the top end surface 2203 in the length direction Y. That is to say, the sliding groove 26 may extend through edges of the rim portions 22 that is close to the top edge 215. The sliding groove 26 may be recessed from the internal surface 2202 in a direction toward an inner side of a second shell 24 of the rim portion 22, that is to say, the sliding groove 26 may be recessed from the internal surface 2202 in a direction toward the external surface 2201. The term "inner side" used here means the side of the protective case 2 that is close to the mobile terminal when the mobile terminal is disposed or received in the protective case 2.

Herein, the sliding groove 26 is unmovable. In fact, as previously stated, the slider 12 of the mobile terminal 1 is slidable along the sliding groove 26.

When the slider 12 is switched between the first position and the second position, the left-side surface 1212 and the right-side surface 1214 may be respectively movable in the corresponding sliding groove 26 to avoid contacting with the rims portions 22. When the slider 12 slides in the middle frame 11, the above structure may reduce a resistance formed by the protective case 2 and applied to the sliding of the slider 12.

When the protective case 2 is sleeved on the outer side of the mobile terminal 1 (as shown in FIGS. 3-6), the portions of the rim portion 22 respectively connected to the first straight edge 213 and the second straight edge 217 may be attached to the pair of side end faces 111. In the present disclosure, A being attached to B means that A is in contact with B. For example, the rim portion 22 may be attached to the side surfaces of the rim 1101, the front housing 1102, and the rear housing 1103 of the mobile terminal 1 that form the side end face 111, respectively. The rim portion 22 may be attached to the mobile terminal 1, such that the rim portion 22 may provide a limitation to the mobile terminal 1, thereby preventing the mobile terminal 1 from being accidentally detached from the protective case 2.

The rear cover 16 of the mobile terminal 1 may face towards the body portion 21 of the protective case 2. The slider 12 of the mobile terminal 1 may be disposed at the same side as the top edge 215 of the body portion 21. The slider 12 may extend out or retract into the protective case relative to the top edge 215. In other words, the slider 12 may be movable back and forth at a notch 2100 above the top edge 215. A gap 261 may be defined between a groove wall in the sliding groove 26 and the slider 12 (as shown in FIG. 2).

In the present disclosure, since the non-connecting portion 212 includes the top edge 215, no rim portion 22 may be disposed on the top edge 215. In other words, the rim portion 22 will not be connected to the top edge 215. In this way, the rim portion 22 will not block the regions near the top edge 215 and the second transitional curved edge 216. Thus, the notch 2100 may be defined at the top edge 215 of the protective case 2, and the sliding structure (such as the slider 12) of the mobile terminal 1 mounted at the inner side of the protective case 2 may extend out or retract back into the protective case through the notch 2100. Therefore, the sliding requirement of the sliding structure of the mobile terminal 1 mounted in the protective case 2 can be met without needing to frequently remove the protective case 2. Thus, the protective case 2 of the present disclosure may be convenient to use.

Meanwhile, the internal surface 2202 of the rim portion 22 defines the sliding groove 26 extending to the top end surface 2203, such that the sliding groove 26 may communicate with the notch 2100, and thus the sliding structure (such as the slider 12) of the mobile terminal 1 may be slidable in the sliding groove 26. Besides, the gap is defined between the groove wall in the sliding groove 26 and the slider 12, and the groove wall in the sliding groove 26 does not contact with the slider 12. In this way, the groove wall in the sliding groove 26 will not provide a sliding resistance to the slider 12, and the slider 12 may be ensured to slide smoothly. When the slider 12 extends out of the receiving groove 118 of the middle frame 11, the slider 12 may also extend out relative to the sliding groove 26 of the protective case 2. When the slider 12 retracts into the receiving groove 118 of the middle frame 11, the slider 12 may also retract relative to the sliding groove 26 of the protective case 2.

In one embodiment, the rim portion 22 may have two top end surfaces 2203. One top end surface 2203 may be formed at the position of the rim portion 22 that is connected to the first straight edge 213 and that faces toward the top edge 215. The other top end surface 2203 may be formed at the position of the rim portion 22 that is connected to the second straight edge 217 and that faces toward the top edge 215.

Two sliding grooves 26 may be defined in some embodiments. The two sliding grooves 26 may be opposite to each other and respectively extend to the two top end surfaces 2203. More specifically, the portion of the rim portion 22 that is connected to the first straight edge 213 may define one sliding groove 26, and the sliding groove 26 may extend to one top end surface 2203 of the rim portion 22. Another portion of the rim portion 22 that is connected to the second straight edge 217 may define another sliding groove 26, and the sliding groove 26 may extend to the other top end surface 2203 of the rim portion 22.

In the present embodiment, two regions of the rim portion 22 that are attached to the slider 12 may each define a sliding groove 26, in order to better ensure that the slider 12 may slide smoothly.

As shown in FIGS. 7-9 together, the periphery (211, 212) of the body portion 21 may have a bottom edge 218. The bottom edge 218 may be disposed opposite to the top edge 215. The bottom edge 218 may be connected between the first straight edge 213 and the second straight edge 217. In one embodiment, the top edge 215, the first straight edge 213, the bottom edge 218, and the second straight edge 217 may be directly connected to each other. In this way, corners of the body portion 21 may be sharp and hands of the user may be easily hurt. In some embodiments, transitional curved edges may be further disposed among the top edge 215, the first straight edge 213, the bottom edge 218, and the second straight edge 217. In this way, the corners of the protective case 2 may be rounded, thereby improving the feel of gripping of the user. The present disclosure may be described by way of example.

More specifically, an extending direction of the bottom edge 218 may be substantially coincident with the direction directed from the first straight edge 213 towards the second straight edge 217. In other words, a line connecting two end points (2181, 2182) of the bottom edge 218 may be substantially perpendicular to the first straight edge 213 or the second straight edge 217. The bottom edge 218 may be substantially a rectilinear edge or an edge substantially in shape of an arc.

The periphery (211, 212) of the body portion 21 may have a first transitional curved edge 214, a second transitional curved edge 216, a third transitional curved edge 219, and a fourth transitional curved edge 210. The first transitional curved edge 214 may be connected between the first straight edge 213 and the first edge 215. The second transitional curved edge 216 may be connected between the top edge 215 and the second straight edge 217. In the length direction Y of the mobile terminal 1, an intersection of the first transitional curved edge 214 and the top edge 215 (that is, one end point 2151 of the top edge 215) may protrude relative to the first transitional curved edge 214 and the top edge 215. An intersection of the second transitional curved edge 216 and the top edge 215 (that is, the other end point 2152 of the top edge 215) may also protrude relative to the second transitional curved edge 216 and the top edge 215.

The third transitional curved edge 219 may be connected between the first straight edge 213 and the bottom edge 218. The fourth transitional curved edge 210 may be connected between the second straight edge 217 and the bottom edge 218. The first straight edge 213, the first transitional curved edge side 214, the top edge 215, the second transitional curved edge side 216, the second straight edge 217, the fourth transitional curved edge side 210, the bottom edge 218, and the third transitional curved edge 219 of the periphery (211, 212) of the body portion 21 may be connected one after another.

In the length direction Y of the mobile terminal 1, an intersection of the third transitional curved edge 219 and the bottom edge 218 (that is, one end point 2181 of the bottom edge 218) may protrude relative to the third transitional curved edge 219 and the bottom edge 218. An intersection of the fourth transitional curved edge 210 and the bottom edge 218 (that is, the other end point 2182 of the bottom edge 218) may also protrude relative to the fourth transitional curved edge 210 and the bottom edge 218.

In this case, the non-connecting portion 212 may include the first transitional curved edge 214 and the second transitional curved edge 216. At this time, no rim portion 22 blocks an upper portion of the first transitional curved edge 214 and an upper portion of the second transitional curved edge 216. In this way, the space above the first transitional curved edge 214 and the second transitional curved edge 216 may form a part of the notch 2100. Thus, more space may be defined for the notch 2100 of the protective case 2 that allows the sliding structure of the mobile terminal 1 to slide.

The connection portion 211 may include the third transitional curved edge 219 and the fourth transitional curved edge 210. When the protective case 2 is sleeved at the outer side of the mobile terminal 1, a portion of the rim portion 22 that is connected to the third transitional curved edge 219 and a portion of the rim portion 22 that is connected to the fourth transitional curved edge 210 may be attached to the mobile terminal 1. More specifically, the portion of the rim portion 22 that is connected to the third transitional curved edge 219 may be attached to the fourth transitional curved surface 117 of the middle frame 11 of the mobile terminal 1, and the portion of the rim portion 22 that is connected to the fourth transitional curved edge 210 may be attached to the third transitional curved surface 116 of the middle frame 11 of the mobile terminal 1 (as shown in FIG. 4). When the rim portion 22 is attached to the third transitional curved surface 116 and the fourth transitional curved surface 117, the rim portion 22 may provide a limitation to the mobile terminal 1, thereby preventing the mobile terminal 1 from being accidentally detached from the protective case 2.

The bottom edge 218 may belong to the connecting portion 211 or the non-connecting portion 212.

In some embodiments, as shown in FIGS. 7-9 together, the bottom edge 218 belongs to the non-connecting portion 212. The number of the rim portions 22 may be two, and the two rim portions 22 may be also called as a first rim portion 221 and a second rim portion 222. The first rim portion 221 may extend from the first straight edge 213 to the third transitional curved edge 219, and the second rim portion 222 may extend from the second straight edge 217 to the fourth transitional curved edge 210. The bottom edge 218 may not be connected to the rim portions 22, and the space defined by the bottom edge 218 may allow the devices or modules inside the mobile terminal 1 to be interacted with the user.

Figure 14:
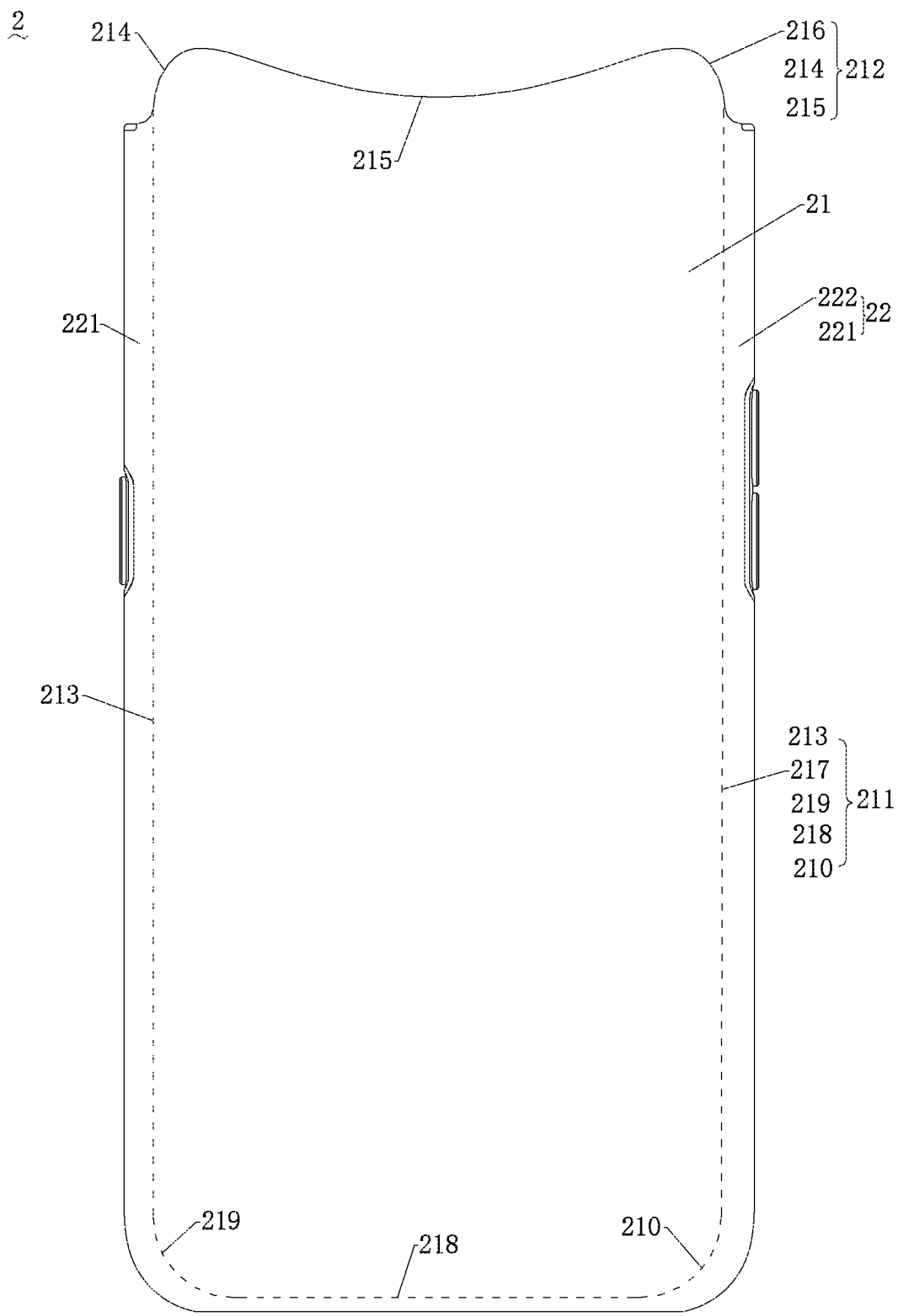
FIG. 14 is a schematic structural view of another protective case for a mobile terminal according to some embodiments of the present disclosure.

In some embodiments, as shown in FIG. 14, FIG. 14 is a schematic structural view of another protective case for a mobile terminal according to some embodiments of the present disclosure. The bottom edge 218 may belong to the connecting portion 211. The number of the rim portions 22 may be two, and the two rim portions 22 may be also called as a first rim portion 221 and a second rim portion 222. The first rim portion 221 may extend from the first straight edge 213, extend through the third transitional curved edge 219, and further extend to the bottom edge 218. The second rim portion 222 may extend from the second straight edge 217, extend through the fourth transitional curved edge 210, and further extend to the bottom edge 218. When the protective case 2 is sleeved at the outer side of the mobile terminal 1, the portion of the rim portion 22 that is connected to the bottom edge 218 may also be attached to the mobile terminal 1, for example, attached to the bottom end face 113 of the mobile terminal 1. Thus, the rim portion 22 may provide a limitation to the mobile terminal 1, and the connection between the protective case of the mobile terminal 1 and the mobile terminal 1 may be stronger, thereby preventing the mobile terminal 1 from being accidentally detached from the protective case 2.

As shown in FIG. 12, the two rim portions (221, 222) may be connected to each other on the bottom edge 218. In other embodiments, a gap may also be defined on the bottom edge 218 and between the two rim portions (221, 222). At this time, a portion of the bottom edge 218 belongs to the connecting portion 211, and the other portion of the bottom edge 218 belongs to the non-connecting portion 212. When the two rim portions (that is, the first rim portion 221 and the second rim portion 222) of the rim portion 22 defines the gap on the bottom edge 218, the transmission portion 125 (for example, the transmission portion 125 may be one or more of the sound-output hole, the sound-input hole, and the connecting through-hole) provided on the bottom end face 113 of the mobile terminal 1 may be exposed outside the protective case 2 via the gap. In this way, the device or module corresponding to the portion of the transmission portion 125 may be convenient to be interacted with the user.

As shown in FIGS. 7 to 9, the top edge 215 of the body 21 of the protective case 2 may have a same shape as the top rim 161 of the rear cover 16 (as shown in FIGS. 4 and 6). At this time, the shape of the top edge 215 of the body portion 21 may match with the shape of the top rim 161 of the rear cover 16, such that the body portion 21 may better protect the rear cover 16.

For example, the top edge 215 may include a central region 2154 and two edge regions 2155 connected to two opposite ends of the central region 2154. The central portion 2154 may be recessed from the two edge regions 2155 towards the middle of the body portion 21. That is to say, in the width direction of the mobile terminal 1, the top edge 215 of the protective case 2 may have a middle portion lower than two ends of the top edge 215.

The top edge 215 may be recessed to form a transmission area 2153 that communicates with the window 1163 of the rear cover 16 of the mobile terminal 1. In some embodiments, as further shown in FIGS. 3 and 4, the camera module 141 may include a front camera 1411 and a rear camera 1413. The light incident surface may include a front light incident surface and a rear light incident surface. The front light incident surface may be formed on the front camera 1411 and exposed out of the front surface 123. The rear light incident surface may be formed on the rear camera 1413 and exposed out of the rear surface 124. When the camera module 141 is in the second position, the front camera 1411 may be exposed out from one side at which the display screen 15 is located, and the rear camera 1413 may be exposed out from one side facing away from the display screen 15 via the notch 2153. With above structure of the protective case 2, it may possible to shorten the moving distance of the camera module 141 between the first position and the second position, such that the rear camera 1413 may be exposed from the notch 2153 after moving a short distance, and thus the time during which the camera module 141 moves from the first position to the second position may be shortened.

In some embodiments, the body portion 21 may include a top end portion 2111. The top end portion 2111 may include the top edge 215, the first transitional curved edge 214, and the second transitional curved edge 216. The transmission area 2153 (also called as notch) may be defined above the top end portion 2111, and the notch 2153 may extend through the edge of the top end portion 2111.

In some embodiments, the body portion 21 may further include a bottom end portion 2113 disposed opposite to the top end portion 2111, a left end portion 2115, and a right end portion 2117 disposed opposite to the left end portion 2115. The left end portion 2115 may be connected between the top end portion 2111 and the bottom end portion 2113, and the right end portion 2117 may be connected between the top end portion 2111 and the bottom end portion 2113. In some embodiments, the first rim portion 221 may be connected to the left end portion 2115, and the second rim portion 222 may be connected to the right end portion 2117. Herein, the bottom end portion 2113 may include the bottom edge 218, the third transitional curved edge 219, and the fourth transitional curved edge 210. The left end portion 2115 may include the second straight edge 217, and the right end portion 2117 may include the first straight edge 213.

As shown in FIG. 7 to FIG. 9, the top end portion 2111 of the body portion 21 may protrude outwardly from one ends of the first rim portion 221 and the second rim portion 222, such that a first opening 310 may be defined in the top end portion 2111. The other end of the first rim portion 221 and the other end of the second rim portion 222 may extend towards to each other along the bottom end portion 2113, such that a second opening 320 may be defined in the bottom end portion 2113. When the mobile terminal 1 is received in the receiving space 3, the slider 12 may protrude out of the first opening 310, thereby preventing the protective case 2 from interfering with the movement of the slider 12. In some embodiments, the maximum distance between the end of the top end portion 2111 defining the first opening 310 and the end of the first rim portion 221 defining the first opening 310 may be less than 15 mm. Above structure may enable the body portion 21 of the protective case 2 to support a portion of the mobile terminal 1 that protrudes from the first opening 310, thereby providing a better protection to the mobile terminal 1.

As shown in FIGS. 8 and 9, a maximum width of the first opening 310 in the width direction X may be greater than a maximum width of the second opening 320 in the width direction X. In some embodiments, the mobile terminal 1 may be disposed in the receiving space 3 of the protective case 2 from the first opening 310. When the mobile terminal 1 is disposed in the receiving space 3, one end of the mobile terminal 1 may abut against ends of the first rim portion 221 and the second rim portion 222 at which the second opening 320 is defined, and the other end of the mobile terminal 1 may protrude from the other ends of the first rim portion 221 and the second rim portion 222 and be further exposed from the receiving space 3. Above structure may facilitate the mounting of the mobile terminal 1 into the protective case 2 of the mobile terminal, and facilitate the removal of the mobile terminal 1 from the receiving space 3.

Further, as shown in FIG. 1 and FIGS. 9-10, in some embodiments, when the mobile terminal 1 is received in the receiving space 3, in the thickness direction of the mobile terminal 1, that is, in the depth direction of the receiving space 3, an end of the first rim portion 221 that is located at the second opening 320 may protrude out of the surface of the display screen 15, and the end of the second rim portion 222 that is located at the second opening 320 may protrude out of the surface of the display screen 15. In the mobile terminal assembly of above structure, when the side of the mobile terminal at which the display screen 15 is located is placed on a support such as a table, portions of the first rim portion 221 and the second rim portion 222 that protrude out of the surface of the display screen 15 may abut against a surface of the support. In this way, is it possible to prevent the display screen 15 from contacting with the surface of the support, thereby preventing a sharp portion of the surface of the support from scratching the surface of the display screen 15.

As shown in FIGS. 7-10 together, at least one of the rim portions 22 may include a first shell 23 and a second shell 24. The first shell 23 may be made of material having a strength greater than a strength of material of the second shell 24. In some embodiments, the body portion 21 and the first shell 23 may be made of the same material, and the first shell 23 and the body portion 21 may be made of Kevlar (the material is "polyparaphenylene terephthalamide", and also known as KEVLAR). The second shell 24 may be made of polyurethane (Thermoplastic Urethane, TPU) material. In other embodiments, the material of the first shell 23 and the material of the second shell 24 may also be other materials.

The first shell 23 may be integrally formed with the body portion 21, and the second shell 24 may be disposed at one side of the first shell 23 that faces towards the receiving space 3 or the body portion 21. In some embodiments, the second shell 24 may wrap or surround or enclose the edge of the first shell 23. Thus, with above structure, the edge of the first shell 23 having a higher hardness will not hurt the surface of the mobile terminal 1, and it is possible to prevent hands of the user from being hurt by the edge of the first shell 23. In other words, the first shell 23 may be located at an outer side of the protective case 2 relative to the second shell 24, and the second shell 24 may be located at an inner side of the protective case 2 relative to the first shell 23. The second shell 24 and the first shell 23 together form the rim portion 22 of the protective case 2. When the protective case 2 is sleeved at the outer side of the mobile terminal 1 (as shown in FIGS. 3-5), the second shell 24 may be located or sandwiched between the first shell 23 and the mobile terminal 1. The top end surface 2203 and the internal surface 2202 may be formed in the second shell 24. The sliding groove 26 may be defined in the second shell 24.

In some embodiments, the sliding groove 26 may extend through the first shell 23 and the second shell 24, and thus a U-shaped opening may be defined at one end of the rim portion 22 that is near the top end portion 2111 of the body portion 21, or a through-hole may be defined. It can be understood that, the sliding groove 26 may not extend through the first shell 23, that is, the sliding groove 26 may be in shape of a recessed groove, and may be defined in the second shell 24.

In some embodiments, it may also possible that the number of the sliding grooves 26 may be two. One of the sliding grooves 26 is defined in the first rim portion 221, the other the sliding grooves 26 is defined in the second rim portion 222.

In some embodiments, since the first shell 23 is located at the outer side of the protective case 2 relative to the second shell 24, and the first shell 23 has a high strength, the risk that the protective case 2 is worn, scratched or torn may be reduced, and thus the service life of the protective case 2 may be extended. Since the second shell 24 is located at the inner side of the protective case 2 relative to the first shell 23, the second shell 24 may be located between the first shell 23 and the mobile terminal 1. In this way, when the electronic device 100 is falling down or cracked, the second shell 24 may act as a buffer between the first shell 23 and the mobile terminal 1, and provide buffering to the mobile terminal 1. Thus, it is possible to prevent the mobile terminal 1 from being damaged due to an external force directly transmitted from the first shell 23 to the mobile terminal 1.

In some embodiments, Kevlar have a permanent heat-resistant flame retardancy, a permanent antistatic property, a permanent acid and alkali resistance, an organic solvent erosion resistance, a high strength, a high wear resistance, a high tear resistance, and the like. The first shell 23 may be a portion of the protective case 2 that is frequently contacted by the user. In this way, the service life of the protective case 2 may be extended, and the use experience may be improved. Besides, the KEVLAR may have many properties, such as having a low density, a high strength, a good toughness, a high temperature resistance, and a wear resistance, and easy for processing and molding. The first shell 23 made of KEVLAR may have a high hardness. When the mobile terminal 1 is mounted in the receiving space 3, the first shell 23 made of above material may clamp the mobile terminal 1, thereby preventing the mobile terminal 1 from being easily separated from the protective case 2.

The second shell 24 may be made of TPU (Thermoplastic polyurethanes). The TPU may have the properties of an abrasion resistance, an oil resistance, a low temperature resistance, a tear resistance, a good elasticity, and the like. The second shell 24 made of TPU may have a low hardness. When the mobile terminal 1 is mounted in the receiving space 3, the second shell 24 made of TPU may abut against an outer surface of the mobile terminal 1, thereby preventing the first shell 23 from scratching surfaces of the mobile terminal 1, and providing better cushioning and damping effects. For example, when the protective case 2 is sleeved on the mobile terminal 1 and the mobile terminal 1 accidentally falls down, the second shell 24 may absorb the impact of the first shell 23, thereby preventing the mobile terminal 1 from being easily broken. When the protective case 2 is sleeved on the mobile terminal 1, the second shell 24 is located at two opposite sides of the mobile terminal 1 in the width direction and may abut against the surfaces of the mobile terminal 1. It can be understood that, the second rim portion 222 may also have the structure of the first shell 23 and the second shell 24, and details may be not described herein again.

The protective case 2 may be formed by the first shell 23 and the second shell 24 by means of two-shot injection molding. In this way, the connection between the first shell 23 and the second shell 24 is strong, and thus the first shell 23 and the second shell are not easily peeled or torn from each other.

As shown in FIGS. 7-10 together, the first shell 23 may define a hollow region 233 at a position corresponding to a button of the mobile terminal 1, and the hollow region 233 in some case may also be called as notch. A portion of the second shell 24 may be embedded or filled in the hollow region 233, such that a button portion 241 may be formed. The button portion 241 may be provided with a cap 242. The cap 242 may protrude out of the hollow region or notch 233, and disposed corresponding to the button. The button 13 may be arranged on the side end face 111 of the mobile terminal 1 (as shown in FIGS. 3-6), and the cap 242 wraps the button 13.

In some embodiments, combining with FIG. 7, a recess 242a may be defined in the cap 242, and the recess 242a may have a configuration (including the size and the shape) matching with that of the button, such that a receiving region 243 may be defined at the inner side of the cap 242, and the button portion 241 may be partially or completely received in the receiving region 243. When the mobile terminal 1 is disposed in the protective case 2, the button 13 of the mobile terminal 1 may be pressed by pressing the cap 242.

More specifically, at the position of the second shell 24 that corresponds to the button of the mobile terminal 1, the second shell 24 may protrude from a side facing towards the receiving space 3 to a side facing away from the receiving space 3, such that the recess 242a configured to receive the button configured to receive the button may be defined. That is to say, the recess 242a is recessed from a side of the second shell 24 that faces towards the receiving space 3 to another side of the second shell 24 that faces away from the receiving space 3.

In the embodiment shown in FIG. 13, the notch or hollow region 233 may be defined at a position corresponding to a volume button of the mobile terminal 1. Since the second shell 24 has a lower material hardness, when the mobile terminal 1 is received in the receiving space 3, the second shell 24 corresponding to the notch or hollow region 233 may be pressed, and easily deformed, such that the second shell 24 may abut against the volume button, and the volume button may be pressed. In this way, the user can adjust the volume of the mobile terminal 1. It can be understood that, the first shell 23 may also define a notch. The second shell 24 may be partially filled in the notch, and the notch in the second rim portion 222 may be defined at a position correspond to a power button of the mobile terminal 1. Since the second shell 24 has a lower material hardness, when the mobile terminal 1 is received in the receiving space 3, the second shell 24 disposed at the position where the power button is located may be pressed, and easily deformed, such that the second shell 24 may abut against the power button, and the power button may be pressed. In this way, the user may turn on or off the mobile terminal, or lock or unlock the screen.

In this case, the second shell 24 may be made of a highly wear-resistant material such as polyurethane, such that the service life of the cap 242 may be extended. Meanwhile, when the second shell 24 is made of polyurethane, the cap may also have an outstanding impact resistance and damping performance, and may be resistant to oil, water, and mold.

The button portion 241 may further include a carrying portion 244. The cap 242 may be arranged on the carrying portion 244. The carrying portion 244 may be spliced with the first shell 23.

Here, as shown in FIG. 7, the button portion 241 may include an outer surface 2411 facing away from the body portion 21 or the receiving space 3. The first shell 23 may include an outer surface 2321 facing away from the body portion 21 or the receiving space 3. The outer surface 2411 of the button portion 241 may be spliced with the outer surface 2321 of the first shell 23, and the outer surface 2411 and the outer surface 2321 may both form a part of an external surface 2201 of the rim portion 22. In some embodiments, a portion of the external surface 2201 formed by the carrying portion 244 may be substantially flush with or at the same level with the outer surface 2321 of the first shell 23, such that the gripping experience of the user may be improved. That is to say, a part of the carrying portion 244 forming the external surface 2201 may be substantially flush with or at the same level with the outer surface 2321 of the rim portion 232.

As shown in FIGS. 7, 9, and 13, the first shell 23 may have an outer peripheral edge 2322 that is not connected to the body portion 21. In other words, the first shell 23 may include a portion that is connected to the bottom plate portion and a portion that is not connected to the bottom plate portion. The portion that is not connected to the bottom plate portion is the outer peripheral edge 2322. The second shell 24 may wrap the outer peripheral edge 2322. Since the second shell 24 wraps the outer peripheral edge 2322, when the outer peripheral edge 2322 is crashed, the second shell 24 may serve as a buffer, and thus the risk of damaging the protective case 2 may be reduced. Further, when the second shell 24 wraps the outer peripheral edge 2322, the first shell 23 may be better separated from the mobile terminal 1, and the second shell 24 can provide a better buffering. Further, when the user touches the protective case 2, the user may be not scratched by the outer peripheral edge 2322 of the first shell 23 having a greater hardness.

Figure 15:
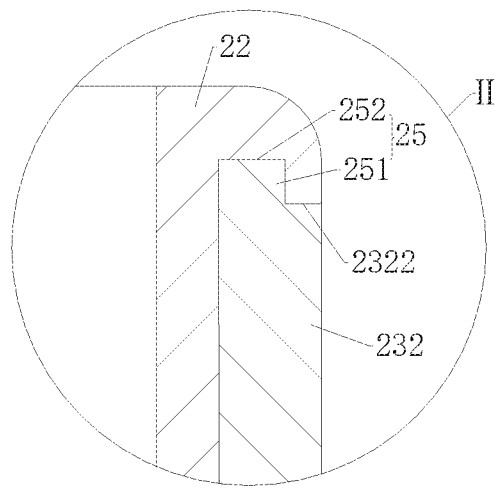
FIG. 15 is an enlarged view showing the structure of part II in the structure shown in FIG. 13.
Figure 16:
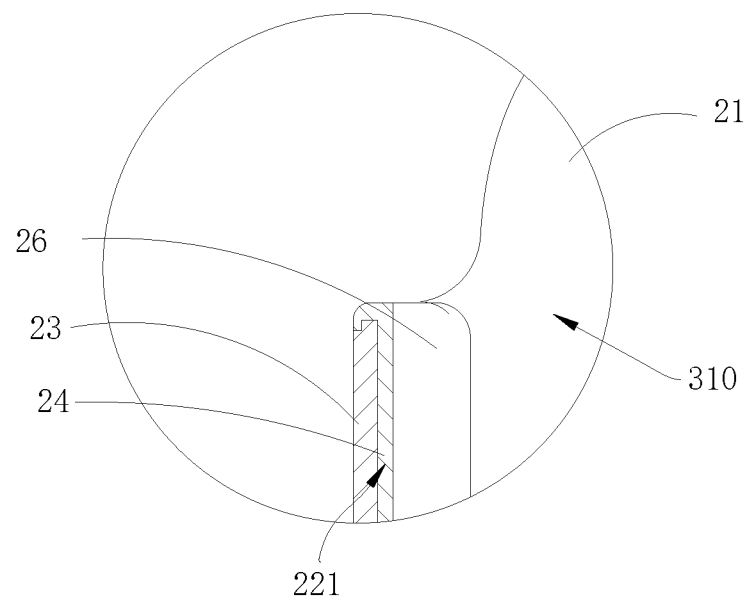
FIG. 16 is an enlarged view showing part III of the protective case for the mobile terminal shown in FIG. 13.

As shown in FIG. 15 together, FIG. 15 is an enlarged view showing the structure of part II in the structure shown in FIG. 13. A mortise and tenon connection structure 25 may be provided between the outer peripheral edge 2322 and the second shell 24. That is, a protrusion 251 may be disposed on one of the outer peripheral edge 2322 and the second shell 24, and a groove 252 may be defined in the other of the outer peripheral edge 2322 and the second shell 24. The protrusion 251 may cooperate with the groove 252, such that the mortise and tenon connection structure 25 is formed, thereby improving the connection strength between the outer peripheral edge 2322 and the second shell 24. For example, the protrusion 251 may be disposed on the outer peripheral edge 2322, and the second shell 24 may define the groove 252. The protrusion 251 of the outer peripheral edge 2322 may be wrapped by the second shell 24 via the groove 252.

As shown in FIGS. 7 and 13 together, the second shell 24 may have an inner surface facing toward the body portion 21. The inner surface may form the internal surface 2202 of the rim portion 22. A clearance groove 246 may be defined in the second shell 24 from the internal surface 2202. More specially, the clearance groove 246 may be recessed from the internal surface 2202 in a direction towards the external surface 2201. When the protective case 2 is sleeved at the outer side of the mobile terminal 1 (as shown in FIGS. 3-5), the clearance groove 246 may be disposed at a position corresponding to the insulating portion 1104. The clearance groove 246 may have a same configuration (including shape and size) with the insulating portion 1104. In this way, when the mobile terminal 1 is assembled to the protective case 2, the insulating portion 1104 may be received or inserted into the clearance groove 246.

In some embodiments, one clearance groove 246 may be provided. However, in other embodiments, it is possible to provide two or more clearance grooves 246. The number and the position of the clearance grooves 246 may be set according to the number and the position of the insulating portions 1104, and the clearance grooves 246 may match with the insulating portions 1104. For example, the number of the insulating portions 1104 may be four. The four insulating portions 1104 may be respectively located at two opposite sides of the rim 1101, and two insulating portions 1104 at the same side of the rim 1101 are spaced from each other in the length direction Y. Then, the number of the clearance grooves 246 may also be four. The four clearance grooves 246 may be respectively located at two opposite sides of the second shell 24, and the two clearance grooves 246 at the same side of the second shell 24 are spaced from each other in the length direction Y. The four clearance grooves 246 may be arranged corresponding to the positions of the four insulating portions 1104, such that when the protective case 2 is sleeved on the mobile terminal 1, the four insulating portions 1104 may be disposed in the four clearance grooves 246 in one-to-one correspondence. In other embodiments, one clearance groove 246 may also be disposed corresponding to a plurality of insulating portions 1104. In the present disclosure, the insulating effect provided by the insulating portion 1104 and between the two adjacent conductive portions 1105 which are separated from each other by the insulating portion 1104 may affect the signal transmission/reception quality of the antenna module in the mobile terminal 1. Since the insulating portion 1104 may provide a better insulating effect when the insulating portion 1104 is disposed corresponding to the clearance groove 246, the protective case 2 may have a less impact on the signal transmission/reception quality of the antenna module in the mobile terminal 1, such that the antenna transmission/reception performance of the electronic device 100 may be reliable.

In some embodiments, in the thickness direction Z of the electronic device 100, a width of the clearance groove 246 may be greater than the width of the rim 1101. In this way, it is possible to further reduce the impact of the second shell 24 on the transmission/reception quality of the antenna module of the mobile terminal 1.

As shown in FIG. 3, FIG. 7 and FIG. 13, in some embodiments, at least one insulating portion 1104 (for example, the top insulator 1106) may be located at the top end of the rim 1101 that is near the receiving groove 118. At least one clearance groove 246 may communicate with the sliding groove 26, and may be located at one side of the sliding groove 26 that is away from the top edge 215. When the protective case 2 is disposed at the outer side of the mobile terminal 1, the clearance groove 246 that communicates with the sliding groove 26 is disposed corresponding to the insulating portion 1104 located at the top end of the rim 1101 (that is, the top insulator 1106). At this time, the clearance groove 246 and the sliding groove 26 may communicate with each other to form a recessed groove. The recessed groove can meet the requirement that the slider 12 does not directly contact with the rim portion 22. Besides, it may also possible to reduce the impact of the second shell 24 on the transmission/reception quality of the antenna module of the mobile terminal 1.

It can be understood that, the display screen 15 of the mobile terminal 1 may be implemented as an LCD (Liquid Crystal Display) screen configured to display information. The LCD screen may be implemented as a TFT (Thin Film Transistor) screen, an IPS (In-Plane Switching) screen, or an SLCD (Splice Liquid Crystal Display) screen. The display screen 15 may also be implemented as an OLED (Organic Light-Emitting Diode) screen configured to display information. The OLED screen may be implemented as an AMOLED (Active Matrix Organic Light Emitting Diode) screen, a Super AMOLED (Super Active Matrix Organic Light Emitting Diode) screen, or a Super AMOLED Plus (Super Active Matrix Organic Light Emitting Diode Plus) screen. These will not be described in details here.

In the protective case for a mobile terminal and the electronic device of the present disclosure, since the first transitional curved edge, the top edge and the second transitional curved edge belong to the non-connecting portion, no side plate is disposed on the first transitional curved edge, the top edge and the second transitional curved edge. In this way, the side plate will not block the regions near the first transitional curved edge, the top edge and the second transitional curved edge. Thus, a notch defined at the first transitional curved edge, the top edge and the second transitional curved edge, and a sliding structure (such as the slider) of the mobile terminal mounted at the inner side of the protective case is capable of extending out or retracting back into the protective case through the notch. Therefore, the sliding requirement of the sliding structure of the mobile terminal mounted in the protective case can be met without needing to frequently remove the protective case, and the protective case of the present disclosure is convenient to use. Further, since the internal surface of the side plate defines the sliding groove extending to the top end surface, the sliding groove communicates with the notch, and the sliding structure (such as the slider) of the mobile terminal is slidable in the sliding groove. Besides, the gap is defined between the groove wall in the sliding groove and the slider, and the groove wall in the sliding groove does not contact with the slider. In this way, the groove wall in the sliding groove will not provide a sliding resistance to the slider, and the slider is ensured to slide smoothly. When the slider extends out of the receiving groove of the middle frame, the slider also extends out relative to the sliding groove of the protective case. When the slider retracts into the receiving groove of the middle frame, the slider also retracts relative to the sliding groove of the protective case.

Furthermore, it is to be understood that the use of the term "substantially" herein, unless otherwise defined with respect to a specific context, with respect to a numeric quantity or otherwise quantifiable relationship, e.g., perpendicularity or parallelism, is to be understood as indicating that quantity ±10%. Thus, for example, lines that are substantially perpendicular to one another may be at angles between 81° and 99° to one another.

The embodiments of the present disclosure have been described in detail above, and the principles and implementations of the present disclosure are described in the specific examples. The description of the above embodiments is only configured to help with the understanding of the method of the present disclosure and its core ideas. Those skilled in the art may make modification in the specific embodiments and the scope of the present disclosure based on the idea of the present disclosure. In summary, the content of the present disclosure should not be construed as a limitation to the present disclosure.

What is claimed is:

1. A protective case for a mobile terminal, comprising: a body portion, having a periphery comprising: a first straight edge; a second straight edge, opposite to the first straight edge; and a top edge, mounted between the first straight edge and the second straight edge; a rim portion, fixed to the periphery of the body portion, wherein the rim portion is mounted on the first straight edge and the second straight edge without contacting with the top edge, such that the rim portion is disconnected to the top edge, the rim portion comprising: an internal surface, facing towards the body portion; an external surface, opposite to the internal surface; a top end surface, connected to the internal surface and located at one end of the rim portion that is close to the top edge without contacting with the top edge; wherein a sliding groove is defined in the rim portion; the sliding groove is recessed from the internal surface in a direction towards the external surface, and further extends to the top end surface; a first shell, fixed to the periphery of the body portion, wherein the first shell defines a notch; and a second shell, fixed to an inner side of the first shell, such that the second shell is sandwiched between the first shell and the mobile terminal when the mobile terminal is received in the protective case, wherein the first shell is made of material having a strength greater than a strength of material of the second shell, wherein the top end and the internal surface are formed on the second shell, wherein a part of the second shell is embedded in the notch to form a button portion, a cap is arranged on the button portion and is disposed corresponding to a button of the mobile terminal, and the cap protrudes out of the notch; and a receiving space, configured to receive the mobile terminal, wherein the body portion and the rim portion operatively define the receiving space, wherein a recess is defined in the cap and recessed from a side of the second shell that faces toward the receiving space to another side of the second shell that faces away from the receiving space, and the recess has a configuration matching with that of the button.

2. The protective case of claim 1, wherein the rim portion comprises a first rim portion connected to the first straight edge and a second rim portion connected to the second straight edge; and each of the first rim portion and the second rim portion defines the sliding groove.

3. The protective case of claim 1, wherein a clearance groove is defined on the internal surface at a position corresponding to an insulating portion of the mobile terminal, and the clearance groove is recessed from the internal surface in a direction towards the external surface; and
    wherein the clearance groove communicates with the sliding groove, and is located at one side of the sliding groove that is away from the top edge.

4. The protective case of claim 1, wherein the periphery of the body portion comprises:
    a bottom edge, disposed opposite to the top edge, wherein a first line connecting two end points of the top edge is substantially perpendicular to the first straight edge or the second straight edge, and a second line connecting two end points of the bottom edge is substantially perpendicular to the first straight edge or the second straight edge;
    a first transitional curved edge, connected between the first straight edge and the top edge, and disconnected to rim portion;
    a second transitional curved edge, connected between the top edge and the second straight edge, and disconnected to rim portion;
    a third transitional curved edge, connected between the first straight edge and the bottom edge, and connected to the rim portion; and
    a fourth transitional curved edge, connected between the second straight edge and the bottom edge, and connected to the rim portion.

5. The protective case of claim 1, wherein the top edge comprises a central region and two edge regions connected to two opposite ends of the central region; and the central region is recessed in a direction towards a middle of the body portion with respect to the two edge regions.

6. The protective case of claim 1, wherein the button portion has a first outer surface facing away from the receiving space, and the first shell has a second outer surface facing away from the receiving space; and the first outer surface of the button portion is spliced with the second outer surface of the first shell.

7. The protective case of claim 1, wherein the first shell has an outer peripheral edge that is disconnected to the body portion, and the second shell wraps the outer peripheral edge.

8. A protective case for a mobile terminal, the mobile terminal comprising:
    a middle frame, comprising:
        a front end face;
        a rear end face, opposite to the front end face;
        a left end face;
        a right end face, disposed opposite to the left end face,
        a top end face; and
        a bottom end face, disposed opposite to the top end face; wherein each of the left end face and the right end face is located between the top end face and the bottom end face; each of the top end face and the bottom end face is located between the left end face and the right end face; and
    a slider, slidable relative to the middle frame, the slider having a first position and a second position, and the slider comprising:
        a front side surface;
        a rear side surface, disposed opposite to the front side surface;
        a left-side surface;
        a right-side surface, disposed opposite to the left-side surface;
        a top surface; and
        a bottom surface, disposed opposite to the top surface; wherein each of the left-side surface and the right-side surface is located between the top surface and the bottom surface; and each of the top surface and the bottom surface is located between the left-side surface and the right-side surface; and
    an electronic component, disposed in the slider; wherein when the slider is in the first position, the electronic component is hidden in the middle frame, the left-side surface is substantially flush with the left end face, the right-side surface is substantially flush with the right end face, and the top surface is substantially flush with the top end face; and when the slider is in the second position, the electronic component is exposed out of the middle frame,
    wherein the protective case comprises:
        a body portion;
        a first rim portion, connected to the body portion, and
        a second rim portion, disposed opposite to the first rim portion and connected to the body portion; wherein the body portion is located between the first rim portion and the second rim portion; the body portion, the first rim portion, and the second rim portion cooperatively define a receiving space configured to receive the mobile terminal;
    wherein a surface of each of the first rim portion and the second rim portion that faces towards the receiving space defines a sliding groove, and the sliding groove extends through an edge of the first rim portion or an edge of the second rim portion;
    wherein when the mobile terminal is received in the receiving space, the first rim portion is attached to the left end face, the second rim portion is attached to the right end face, and the body portion is attached to the rear end face; and
    wherein when the slider is switched between the first position and the second position, the left-side surface and the right-side surface are respectively movable in the sliding groove without contacting with the first rim portion and the second rim portion.

9. The protective case of claim 8, wherein at least one of the first rim portion and the second rim portion comprises a first shell and a second shell; the first shell is integrally formed with the body portion, and the second shell is disposed at one side of the first shell that faces towards the receiving space.

10. The protective case of claim 9, wherein the body portion and the first shell are made of KEVLAR, and the second shell is made of TPU.

11. The protective case of claim 9, wherein the second shell wraps an edge of the first shell.

12. The protective case of claim 9, wherein at least one of the first rim portion and the second rim portion defines a notch at a position corresponding to a button of the mobile terminal, and the second shell comprises a cap protruding out of the notch; and the cap is disposed corresponding to the button; and wherein a recess is defined in the cap and recessed from one side of the second shell that faces towards the receiving space to another side of the second shell that faces away from the receiving space; and the recess has a configuration matching with that of the button.

13. The protective case of claim 9, wherein the body portion comprises:

a top end portion, protruding outwardly from one ends of the first rim portion and the second rim portion, such that a first opening is defined in the top end portion;

a bottom end portion, disposed opposite to the top end portion, wherein the other end of the first rim portion and the other end of the second rim portion extend towards to each other along the bottom end portion, such that a second opening is defined in the bottom end portion;

a left end portion, connected between the top end portion and the bottom portion; and a right end portion, disposed opposite to the left end portion, and connected between the top end portion and the bottom end portion, wherein the first rim portion is connected to the left end portion, and the second rim portion is connected to the right end portion; and wherein a maximum width of the first opening in a width direction of the protective case is greater than a maximum width of the second opening in the width direction of the protective case.

14. An electronic device, comprising:

a mobile terminal, comprising:

a middle frame, comprising a pair of side end faces and a top end face connected between the pair of side end faces; wherein the top end face defines a receiving groove penetrating through the pair of side end faces; and a slider, slidable relative to the middle frame, such that the slider is capable of extending out of or retracting into the receiving groove; and a protective case, capable of being detachably sleeved at an outer side of the mobile terminal and the protective case comprising:

a body portion, having a periphery comprising:

a first straight edge;

a second straight edge, opposite to the first straight edge; and a top edge, connected between the first straight edge and the second straight edge; and a rim portion, fixed to the periphery of the body portion, wherein the rim portion is connected to the first straight edge and the second straight edge, and disconnected to the top edge; the rim portion comprises:

an internal surface, facing towards the body portion;

an external surface, opposite to the internal surface; and a top end surface, connected to the internal surface and located at one end of the rim portion that is close to the top edge; wherein a sliding groove is defined in the rim portion; and the sliding groove is recessed from the internal surface in a direction towards the external surface, and further extends to the top end surface, wherein when the protective case is sleeved at the outer side of the mobile terminal, a portion of the rim portion that is connected to the first straight edge is attached to one of the pair of side end faces, and a portion of the rim portion that is connected to the second straight edge is attached to the other of the pair of side end faces; and the slider is capable of extending or retracting relative to the top edge, and a gap is defined between a groove wall in the sliding groove and the slider.

15. The electronic device of claim 14, wherein the middle frame of the mobile terminal comprises an insulating portion and a plurality of conductive portions that are separated from each other by the insulating portion; the internal surface defines a recessed clearance groove at a position corresponding to the insulating portion; the clearance groove is recessed from the internal surface in a direction towards the external surface; and when the protective case is sleeved at the outer side of the mobile terminal, the clearance groove is disposed corresponding to the insulating portion.

16. The electronic device of claim 14, wherein the mobile terminal comprises a rear cover fixed to the middle frame, and the rear cover has a top rim facing towards the top end face; the top rim comprises an intermediate portion and two edge portions connected to two opposite ends of the intermediate portion; and the intermediate portion is recessed toward a middle of the rear cover relative to the two edge portions; the top edge of the protective case has a same shape as the top rim.

17. The electronic device of claim 14, wherein the rim portion comprises:

a first shell, fixed to the periphery of the body portion; and a second shell, fixed to an inner side of the first shell; wherein the first shell is made of material having a strength greater than a strength of material of the second shell; the top end surface and the internal surface are formed on the second shell, wherein when the protective case is sleeved at the outer side of the mobile terminal, the second shell is located between the first shell and the mobile terminal.

18. The electronic device of claim 17, wherein a button is arranged on the mobile terminal; the first shell defines a notch; a part of the second shell is embedded in the notch to form a button portion, and a cap is arranged on the button portion and disposed corresponding to the button; and the cap protrudes out of the notch;

wherein a recess is defined in the cap and recessed from a side of the second shell that faces towards the receiving space to another side of the second shell that faces away from the receiving space; and the recess has a configuration matching with that of the button; and wherein when the protective case is sleeved at the outer side of the mobile terminal, the button is received in the recess and wrapped by the cap.

* * * * *